US011915711B2

United States Patent
Artsiom

(10) Patent No.: US 11,915,711 B2
(45) Date of Patent: Feb. 27, 2024

(54) METHOD AND SYSTEM FOR AUGMENTING AUDIO SIGNALS

(71) Applicant: YANDEX EUROPE AG, Lucerne (CH)

(72) Inventor: Kanstantsin Artsiom, Minsk (BY)

(73) Assignee: Direct Cursus Technology L.L.C, Dubai (AE)

(*) Notice: Subject to any disclaimer, the term of this patent is extended or adjusted under 35 U.S.C. 154(b) by 66 days.

(21) Appl. No.: 17/584,582

(22) Filed: Jan. 26, 2022

(65) Prior Publication Data

US 2023/0029288 A1 Jan. 26, 2023

(30) Foreign Application Priority Data

Jul. 20, 2021 (RU) ........................... RU2021121563

(51) Int. Cl.
*G10L 19/018* (2013.01)

(52) U.S. Cl.
CPC .................................. *G10L 19/018* (2013.01)

(58) Field of Classification Search
CPC ..................................................... G10L 19/018
See application file for complete search history.

(56) References Cited

U.S. PATENT DOCUMENTS 8,300,820 B2 10/2012 Rhein
9,299,356 B2 * 3/2016 Wabnik ................. G10L 19/018
9,626,977 B2 4/2017 Blesser et al.
9,728,188 B1 8/2017 Rosen et al.
9,928,840 B2 3/2018 Sharifi et al.
10,074,364 B1 9/2018 Wightman et al.
10,079,024 B1 9/2018 Bhimanaik et al.
10,147,433 B1 12/2018 Bradley
10,152,966 B1 12/2018 O'Malley et al.
(Continued)

FOREIGN PATENT DOCUMENTS

CN 109272991 A 1/2019
CN 110070863 A 7/2019
RU 2705769 C1 11/2019

OTHER PUBLICATIONS

Notice of Allowance dated Aug. 15, 2022 issued in respect of a related U.S. Appl. No. 17/095,812.
(Continued)

*Primary Examiner* — Daniel R Sellers
(74) *Attorney, Agent, or Firm* — BCF LLP

(57) ABSTRACT

A method and a system for augmenting an audio feed for inclusion of data therein suitable for determining an identity of a human assessor are provided. The method comprises: receiving the audio feed; receiving an indication of identity of the human assessor to whom the audio feed is to be transmitted, the indication of identity being representable by a unique sequence of bits; generating, based on the unique sequence of bits, an identity watermark associated with the human assessor to be included in the audio feed to generate an augmented audio feed, by modifying the audio signal to have predetermined energy level at each of at least two different frequency levels to indicate presence of the given bit of the unique sequence of bits associated with the human assessor in the augmented audio feed; and transmit the augmented audio feed to an electronic device associated with the human assessor.

12 Claims, 10 Drawing Sheets

(56) References Cited

U.S. PATENT DOCUMENTS

| | | | | |
|---|---|---|---|---|
| 10,276,175 | B1 | 4/2019 | Garcia | |
| 10,395,650 | B2 | 8/2019 | Garcia | |
| 2003/0169804 | A1* | 9/2003 | Kudumakis | H04H 20/31 375/240.01 |
| 2004/0073916 | A1* | 4/2004 | Petrovic | H04H 20/31 348/E7.071 |
| 2012/0089392 | A1 | 4/2012 | Larco et al. | |
| 2013/0060571 | A1 | 3/2013 | Soemo et al. | |
| 2013/0132095 | A1 | 5/2013 | Murthi et al. | |
| 2015/0340045 | A1* | 11/2015 | Hardwick | G10L 19/018 704/205 |
| 2017/0110130 | A1 | 4/2017 | Sharifi et al. | |
| 2017/0287500 | A1 | 10/2017 | De Mers et al. | |
| 2018/0350376 | A1 | 12/2018 | Embleton et al. | |
| 2019/0051299 | A1 | 2/2019 | Ossowski et al. | |
| 2019/0287536 | A1 | 9/2019 | Sharifi et al. | |
| 2020/0220935 | A1 | 7/2020 | Bao | |
| 2021/0050025 | A1* | 2/2021 | Huffman | G06N 3/045 |

OTHER PUBLICATIONS

Haitsma et al., “A Highly Robust Audio Fingerprinting System”, ISMIR 2002, 3rd International Conference on Music Information Retrieval, Paris, France, Oct. 13-17, 2002, Proceedings, http://ismir2002.ismir.net/proceedings/02-FP04-2.pdf, 9 pages.

English Abstract for CN110070863 retrieved on Espacenet on Nov. 11, 2020.

English Abstract for CN109272991 retrieved on Espacenet on Nov. 11, 2020.

Wikipedia, “Band-stop filter”, https://en.wikipedia.org/wiki/Band-stop_filter, accessed Nov. 11, 2020, 4 pages.

Search Report with regard to the counterpart RU Patent Application No. 2020113388 completed Dec. 9, 2021.

* cited by examiner

METHOD AND SYSTEM FOR AUGMENTING AUDIO SIGNALS

CROSS-REFERENCE

The present application claims priority to Russian Patent Application No. 2021121563, entitled "Method and System for Augmenting Audio Signals," filed Jul. 20, 2021, the entirety of which is incorporated herein by reference.

TECHNICAL FIELD

The present technology relates to the field of signal processing in general; and specifically, to a method and a system for augmenting an audio feed.

BACKGROUND

Electronic devices, such as smartphones and tablets, are able to access an increasing and diverse number of applications and services for processing and/or accessing different types of information. However, novice users and/or impaired users and/or users may not be able to effectively interface with such devices mainly due to the variety of functions provided by these devices or the inability to use the machine-user interfaces provided by such devices (such as a keyboard). For example, a user who is driving or a user who is visually impaired may not be able to use the touch screen or the keyboard associated with some of these devices.

Virtual assistant applications have been developed to perform functions in response to such user requests. Such virtual assistant applications may be used, for example, for information retrieval, navigation, but also a wide variety of commands. A conventional virtual assistant application (such as a Siri™ virtual assistant application, an Alexa™ virtual assistant application, and the like) can receive a spoken user utterance in a form of a digital audio signal from an electronic device and perform a large variety of tasks for the user. For example, the user can communicate with the virtual assistant application by providing spoken utterances for asking, for example, what the current weather is like, where the nearest shopping mall is, and the like. In response, the virtual assistant application may provide the user with a respective answer, such as "Rockland shopping center is just 7-minute walk away from you" or "It's warm and sunny outside, no need to take your umbrella".

In order to enable the virtual assistant application to provide such answers, first, a machine-learning algorithm (MLA) could be trained, based on a training dataset, to generate respective answers in response to user commands. For example, the training dataset may include various training objects, a given one of which may include an indication of a training user command and a label including an indication of a respective training answer. As the training dataset may include a large number of training objects (such as thousands or even tens or hundreds of thousands), the training data set may be obtained by assigning digital tasks to human assessors via crowdsourcing platforms, such as an Amazon Mechanical Turk™ crowdsourcing platform, Yandex Toloka™ crowdsourcing platform, and the like, who have been provided with instructions on labelling training user commands.

Further, once the MLA has been trained to generate the answers, the answers may be recorded, and the same or different human assessors may further be provided with the recordings and instructed, for example, to transcribe them for the virtual assistant application and/or validate if the virtual assistant application operates correctly, providing expected answers to sample user commands.

However, some human assessors may deliberately or unintentionally cause public access to the recordings they have been provided with for completion of digital tasks as mentioned above. For example, human assessors may re-record the recordings using their private electronic devices and further post so generated copies of the recordings on their pages on social networks.

As it can be appreciated, the leaked recordings may disclose new features of the virtual assistant application before their official release and can further be modified and/or misused by other users causing reputational and financial damages to the entity owning the virtual assistant application.

Certain prior art approaches have been proposed to tackle the above-identified technical problem.

U.S. Pat. No. 9,299,356-B2 issued on Mar. 29, 2016, assigned to Fraunhofer Gesellschaft zur Forderung der Angewandten Forschung eV, and entitled "*Watermark Decoder and Method for Providing Binary Message Data*" discloses a watermark decoder including a time-frequency-domain representation provider, a memory unit, a synchronization determiner and a watermark extractor. The time-frequency-domain representation provider provides a frequency-domain representation of the watermarked signal for a plurality of time blocks. The memory unit stores the frequency-domain representation of the watermarked signal for a plurality of time blocks. Further, the synchronization determiner identifies an alignment time block based on the frequency-domain representation of the watermarked signal of a plurality of time blocks. The watermark extractor provides binary message data based on stored frequency-domain representations of the watermarked signal of time blocks temporally preceding the identified alignment time block considering a distance to the identified alignment time block.

U.S. Pat. No. 8,300,820-B2 issued on Oct. 30, 2012, assigned to CUGATE AG, and entitled "*Method of Embedding a Digital Watermark in a Useful Signal*" discloses methods of embedding a digital watermark in a useful signal, wherein a watermark bit sequence is embedded into the frequency domain of the useful signal using adaptive frequency modulation of two given frequencies by tracking amplitudes of the chosen frequencies of the original signal and modifying them according to the current bit of watermark bit sequence.

United States Patent Application Publication No.: 2020/220,935-A1 published on Jul. 9, 2020, assigned to Amazon Technologies Inc., and entitled "*Speech Processing Performed with respect to First and Second User Profiles in a Dialog Session*" discloses techniques for implementing a "volatile" user ID are described. A system receives first input audio data and determines first speech processing results therefrom. The system also determines a first user that spoke an utterance represented in the first input audio data. The system establishes a multi-turn dialog session with a first content source and receives first output data from the first content source based on the first speech processing results and the first user. The system causes a device to present first output content associated with the first output data. The system then receives second input audio data and determines second speech processing results therefrom. The system also determines the second input audio data corresponds to the same multi-turn dialog session. The system determines a second user that spoke an utterance represented in the second input audio data and receives second output data from the first content source based on the second speech processing results and the second user. The system causes the device to present second output content associated with the second output data.

SUMMARY

It is an object of the present technology to ameliorate at least some of the inconveniences present in the prior art.

Developers of the present technology have appreciated that personalizing recordings to be sent to respective human assessors by adding thereto identity watermarks including identity information of the human assessors (such as their ID number on their crowdsourcing platform, for example) may help identify the human assessor who leaked the information and potentially prevent damages incurred by the entity owning the virtual assistant application in case of unauthorized disclosure of its recordings.

More specifically, the developers have devised systems and methods for adding an identity watermark in the respective audio signal of a given recording by equally modulating energy levels of the respective audio signal at a respective set of predetermined frequency levels for each bit of the identity watermark.

Thus, once the identity watermark has been added to the original audio signal of the recording, it may further be detected when the recording is reproduced in a vicinity of an electronic device configured to execute methods described herein. More specifically, having received an audio signal of the recording, to recognize the given bit of the identify watermark therein, such an electronic device can be configured to (1) determine, in the received audio signal, the energy levels on each of the respective set of predetermined frequency levels associated with the given bit; (2) determine an aggregate value indicative of the determined energy levels; and (3) compare the aggregate value with predetermined threshold.

Thus, the developers have appreciated that, as opposed to an approach where a value of each given bit corresponds to an energy level at a single respective frequency level of the respective audio signal, the present methods of adding the identity watermark may increase the robustness of the detection thereof to various types of noise imposed on the original audio signal during its transmission, reproduction, and conversion. As a result, the present methods and systems may allow increasing the quality of detection of the identity watermarks in audio signals of recordings being part of intellectual property of entities associated with the virtual assistant application, which may further enable to identify human assessors breaching the NDA. Further, once the mala fide human assessors have been identified, preventive measures can be taken against them in a timely manner—such as restricting further access thereto to their accounts in crowdsourcing platforms, in order to prevent further leakages of information.

As it can be appreciated, the present methods and systems directed to identifying users breaching the NDA are not limited solely to recordings used in virtual assistant applications; and may rather be used for protecting various types of audio feeds from being illegally disclosed, such as those of audio production companies, music subscription applications, and the like.

More specifically, in accordance with a first broad aspect of the present technology, there is provided a computer-implemented method of More specifically, in accordance with a first broad aspect of the present technology, there is provided a computer-implemented method for augmenting an audio feed to be provided to a human assessor for completing one or more digital tasks. The augmenting is for modifying the audio feed to include data suitable for determining an identity of the human assessor for determining an association between the audio feed and the human assessor. The method is executable by a production server. The method comprises: receiving, by the production server, the audio feed, the audio feed having been pre-recorded; receiving, by the production server, an indication of identity of the human assessor to whom the audio feed is to be transmitted, the indication of identity being representable by a unique sequence of bits; generating, by the production server, based on the unique sequence of bits, an identity watermark associated with the human assessor to be included in the audio feed to generate an augmented audio feed, the generating including: determining, by the production server, for a given bit of the unique sequence of bits, at least two different frequency levels from a predetermined audio spectrum to convey a value of the given bit in an audio signal associated with the augmented audio feed, a first one of the at least two different frequency levels being for indicating the value of the given bit; other ones of the at least two different frequency levels being for replicating values indicated by the first one of the at least two frequencies; and the value of the given bit being indicated by a predetermined energy level of the audio signal; modifying, by the production server, the audio signal to have the predetermined energy level at each one of the at least two different frequency levels to indicate presence of the given bit of the unique sequence of bits associated with the human assessor in the augmented audio feed; and transmitting the augmented audio feed including the identity watermark to an electronic device associated with the human assessor for completion of the one or more digital tasks based on appreciation of the augmented audio feed.

In some implementations of the method, the value of the given bit is a binary value with ‘0’ being represented by a zero energy level of the audio signal associated with the augmented audio feed at each one of the at last two different frequency levels; and the modifying comprising excluding a respective portion of the audio signal at each one of the at least two different frequency levels.

In some implementations of the method, the excluding the respective portion from the audio signal forms a sound gap when the augmented audio feed is reproduced, the sound gap being substantially unrecognizable by a human ear.

In some implementations of the method, the excluding comprises applying a respective notch filter to the audio signal.

In some implementations of the method, the predetermined audio spectrum comprises an audio spectrum recognizable by a human ear.

In some implementations of the method, each one of the at least two different frequency levels has been selected in a respective range of the predetermined audio spectrum.

In some implementations of the method, each one of the at least two different frequency levels has been randomly selected.

In some implementations of the method, each one of the at least two different frequency levels has been randomly pre-selected.

In some implementations of the method, each one of the at least two different frequency levels has been selected with a predetermined step.

In some implementations of the method, the modifying the audio signal comprises first converting the audio signal into a time-frequency representation thereof.

In some implementations of the method, the converting comprises applying a Fourier transform to the audio signal.

In accordance with a second broad aspect of the present technology, there is provided a computer-implemented method for determining an association between a human assessor and a given audio feed. The method is executable by an electronic device. The method comprises: capturing, by the electronic device, an in-use audio signal having been generated in a vicinity of the electronic device in response to reproducing the given audio feed; determining, by the electronic device, presence of an identity water mark associated with the human assessor in the in-use audio signal, the identity watermark having been generated based on an indication of identity of the human assessor, the indication of identity being representable by a unique sequence of bits; a respective value of a given bit of the unique sequence of bits having been indicated, in the given audio feed, by modifying respective energy levels of an original audio signal associated therewith at at least two different frequency levels; determining the respective value of the given bit including: determining, by the electronic device, a respective primary energy level of the in-use audio signal at each one of the at least two different frequency levels; determining, by the electronic device, a respective secondary energy level of the in-use audio signal at a respective adjacent frequency level to each one of the at least two different frequency levels; determining, by the electronic device, for each one of the at least two different frequency levels, a respective difference value between the respective primary energy level and the respective secondary energy level of the in-use audio signal; aggregating, by the electronic device, respective difference values associated with the at least two different frequency levels to determine an aggregate difference value associated with the given bit; determining, based on the aggregate difference value, a respective value of the given bit for inclusion thereof in an in-use sequence of bits associated with the in-use audio signal; and in response to the in-use sequence of bits corresponding to the unique sequence of bits associated with the human assessor, determining the presence of the identity watermark in the in-use audio signal, thereby determining the given audio feed as having been personalized for the human assessor for transmission thereto for completion one or more digital tasks based on appreciation of the given audio feed.

In some implementations of the method, the respective value of the given bit is a binary value, the aggregating the respective difference values comprises: determining a first aggregate value as a sum over respective difference values associated with those of the at least two different frequency levels at which respective primary energy levels are indicative of the respective value of the given bit being 1'; determining a second aggregate value as a sum over respective difference values associated with those of the at least two different frequency levels at which respective primary energy levels are indicative of the respective value of the given bit being ‘0’; determining the aggregate difference value as being a difference between the first aggregate value and the second aggregate value; and wherein the determining the respective value of the given bit, based on the aggregate difference value comprises: determining the respective value as being ‘1’ if the aggregate difference value is a positive value; and determining the respective value as being ‘0’ if the aggregate difference value is a non-positive value.

In some implementations of the method, the method further comprises, for a given frequency level of the at least two different frequency levels, the given frequency level being associated with the respective primary energy level of the in-use audio signal at the given frequency level: determining a first respective secondary energy level at a first respective adjacent frequency level higher than the given frequency level; determining a second respective secondary energy level at a second adjacent frequency level lower than the given frequency level; determining a first respective difference value between the respective primary energy level and the first respective secondary energy level; determining a second respective difference value between the respective primary energy level and the second respective secondary energy level and wherein: the determining the respective difference value comprises determining a minimum one of the first respective difference value and the second respective difference value.

In some implementations of the method, the electronic device is an electronic device associated with the human assessor.

In some implementations of the method, the method is executable by a server configured to obtain the given audio feed, and wherein the in-use audio signal is generated by the server by processing the given audio feed.

In some implementations of the method, the server is configured to obtain the given audio feed by searching therefor at least one network resource.

In some implementations of the method, the determining the presence of the identity watermark in the in-use audio signal comprises first converting the in-use audio signal in a time-frequency representation thereof.

In some implementations of the method, the determining the given audio feed as having been personalized for the human assessor further includes generating, by the electronic device, a predetermined notification for transmission thereof to an entity associated with producing the given audio feed.

In accordance with a third broad aspect of the present technology, there is provided a system for augmenting an audio feed to be provided to a human assessor for completing one or more digital tasks. The augmenting is for modifying the audio feed to include data suitable for determining an identity of the human assessor for determining an association between the audio feed and the human assessor. The system includes a production server including: a processor and a non-transitory computer-readable medium comprising instructions. The processor, upon executing the instructions, is configured to: receive the audio feed, the audio feed having been pre-recorded; receive an indication of identity of the human assessor to whom the audio feed is to be transmitted, the indication of identity being representable by a unique sequence of bits; generate, based on the unique sequence of bits, an identity watermark associated with the human assessor to be included in the audio feed to generate an augmented audio feed, by: determining for a given bit of the unique sequence of bits, at least two different frequency levels from a predetermined audio spectrum to convey a value of the given bit in an audio signal associated with the augmented audio feed, a first one of the at least two different frequency levels being for indicating the value of the given bit; other ones of the at least two different frequency levels being for replicating values indicated by the first one of the at least two frequencies; and the value of the given bit being indicated by a predetermined energy level of the audio signal; modify the audio signal to have the predetermined energy level at each one of the at least two different frequency levels to indicate presence of the given bit of the unique sequence of bits associated with the human assessor in the augmented audio feed; and transmit the augmented audio feed including the identity watermark to an electronic device associated with the human assessor for completion of the one or more digital tasks based on appreciation of the augmented audio feed.

In the context of the present specification, the terms "audio feed" and "audio file" broadly refer to any digital audio file and/or analog audio tracks (including those being part of video) of any format and nature and including, without being limited, advertisements, news feeds, audio tracks of blog videos and TV shows, and the like. As such, audio feeds, as referred to herein, represent electronic media entities that are representative of electrical signals having frequencies corresponding to human hearing and suitable for being transmitted, received, stored, and reproduced using suitable soft- and hardware.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
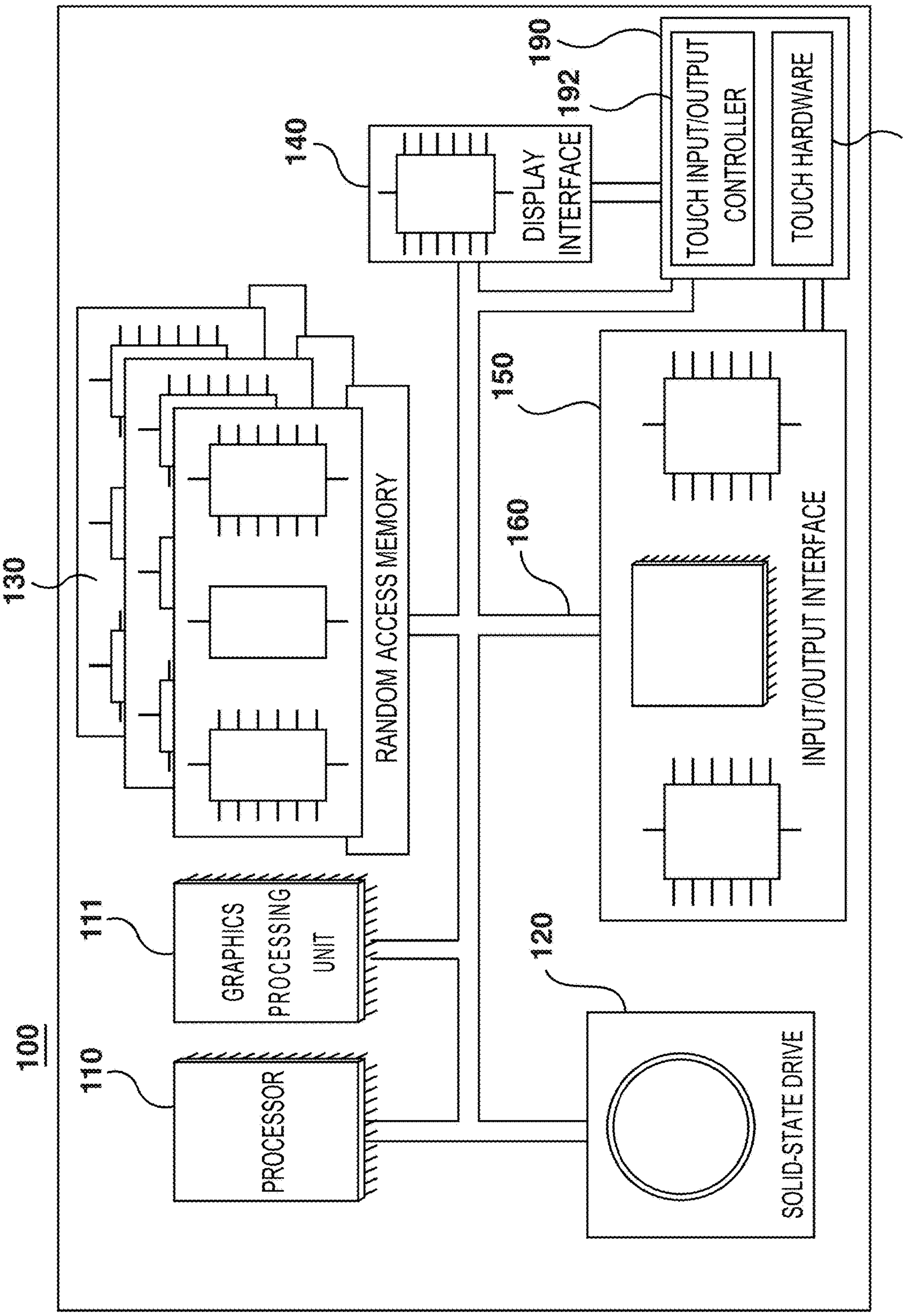
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 including, for example, however, without limitation, a Peripheral Component Interconnect (PCI) bus, a Universal Serial bus (USB), IEEE 1394 "Firewire" bus, a Small Computer System Interface (SCSI) bus, a Serial At Attachment (SATA) bus, and others, to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190. In some embodiments, the computer system 100 may comprise one or more microphones (not shown). The microphones may record audio, such as user utterances. The user utterances may be translated to commands for controlling the computer system 100.

It is noted some components of the computer system 100 can be omitted in some non-limiting embodiments of the present technology. For example, the touchscreen 190 can be omitted, especially (but not limited to) where the computer system is implemented as a smart speaker device.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
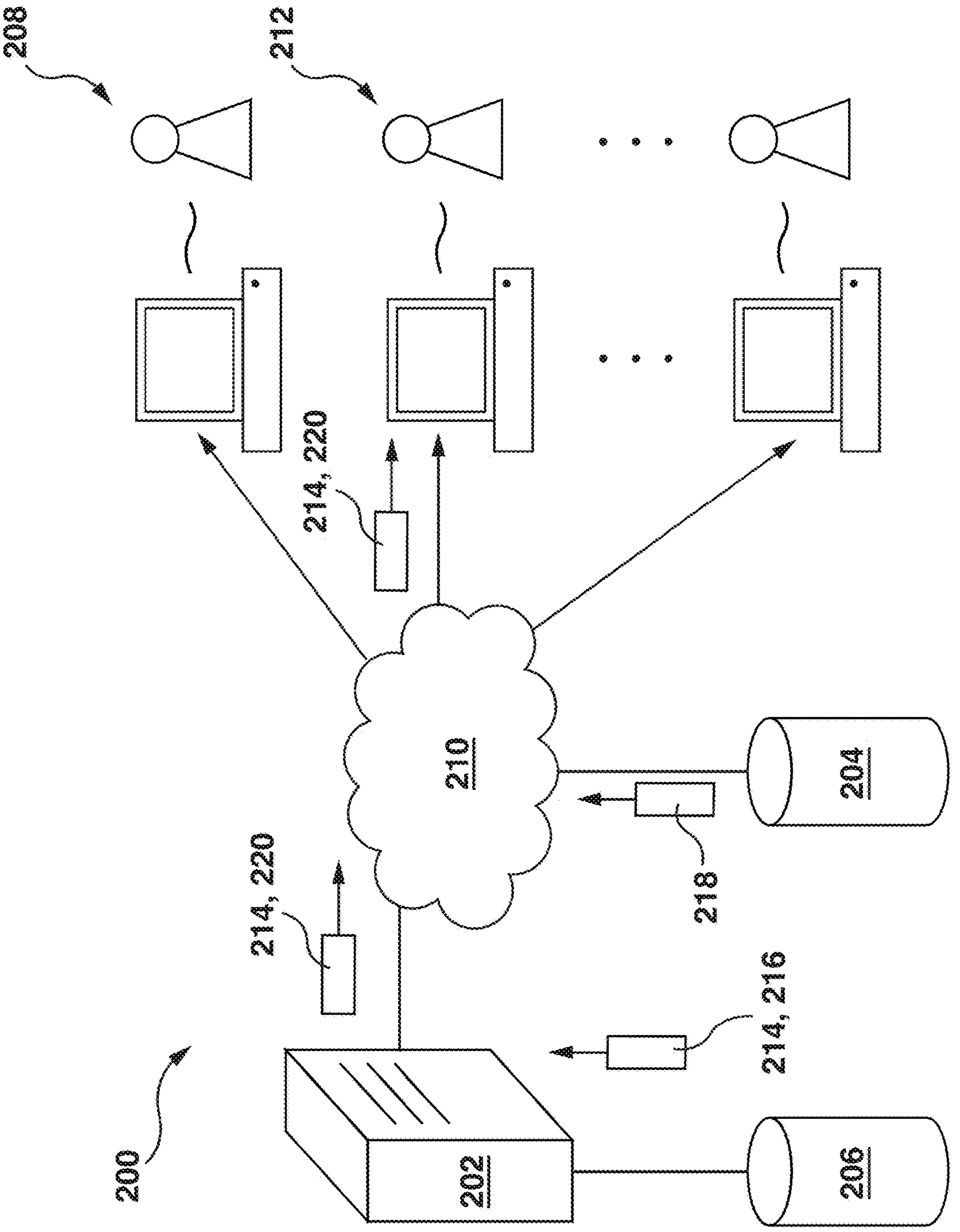
FIG. 2 depicts a networked computing environment suitable for augmenting an audio feed with a respective identity watermark of a given assessor, in accordance with certain non-limiting embodiments of the present technology.

With reference to FIG. 2, there is depicted a schematic diagram of a networked computing environment 200 suitable for use with some non-limiting embodiments of the systems and/or methods of the present technology. In some non-limiting embodiments of the present technology, the network computing environment 200 may include a server 202 configured to provide one or more digital tasks, for further completion thereof, to respective ones of a plurality of assessors 208.

To that end, the server 202 could be communicatively coupled, over communication network 210, to an assessor database 204. According to certain non-limiting embodiments of the present technology, the assessor database 204 may comprise indications of identities of each one of the plurality of assessors 208 (such as human assessors) available for completing at least one digital task (also referred to herein as a "human intelligence task (HIT)", a crowd-sourced task, or simply, a task) to be sent thereto. In some non-limiting embodiments of the present technology, an indication of identity of a given assessor 212 of the plurality of assessors 208 include certain data allowing for unique identification of the given assessor 212 amongst the plurality of assessor 208 which may include, without limitation, a first and a last name of the given assessor 212, various acronyms and aliases generated based on at least partial combinations of the names and a unique identifier of the given assessor 212, and the like. In some non-limiting embodiments of the present technology, the indication of identity associated with the given assessor 212 may include a unique ID number pre-generated for the given assessor 212.

In some non-limiting embodiments of the present technology, the assessor database 204 can be under control and/or management of a provider of crowd-sourced services, such as Yandex LLC of Lev Tolstoy Street, No. 16, Moscow, 119021, Russia. In alternative non-limiting embodiments of the present technology, the assessor database 204 can be operated by a different entity.

The implementation of the assessor database 204 is not particularly limited and, as such, the assessor database 204 could be implemented using any suitable known technology, as long as the functionality described in this specification is provided for. Also, although in the depicted embodiments of FIG. 2, the assessor database 204 is coupled to the server 202 via the communication network 210, it should be noted that, in alternative non-limiting embodiments of the present technology, the assessor database 204 can be coupled to the server 202 directly, via a respective communication link.

It is contemplated that the assessor database 204 can be stored at least in part at the server 202 and/or be managed at least in part by the server 202. In accordance with the non-limiting embodiments of the present technology, the assessor database 204 comprises sufficient information associated with the identity of at least some of the plurality of assessors 208 to allow an entity that has access to the assessor database 204, such as the server 202, to assign and transmit one or more digital tasks to be completed by the assessors.

In some non-limiting embodiments of the present technology, the server 202 can be operated by the same entity that operates the assessor database 204. In alternative non-limiting embodiments of the present technology, the server 202 can be operated by an entity different from the one that operates the assessor database 204.

In some non-limiting embodiments of the present technology, the server 202 can be implemented as a conventional computer server and may thus comprise some or all of the components of the computer system 100 of FIG. 1. As a non-limiting example, the server 202 can be implemented as a Dell™ PowerEdge™ Server running the Microsoft™ Windows Server™ operating system. Needless to say, the server 202 can be implemented in any other suitable hardware and/or software and/or firmware or a combination thereof. In the depicted non-limiting embodiment of the present technology, the server 202 is a single server. In alternative non-limiting embodiments of the present technology, the functionality of the server 202 may be distributed and may be implemented via multiple servers.

Further, in accordance with certain non-limiting embodiments of the present technology, the server 202 may be communicatively coupled, via a respective communication link, to a task database 206. As it may be appreciated, in alternative non-limiting embodiments of the present technology, the task database 206 can be coupled to the server 202 via the communication network 210. Although the task database 206 is illustrated schematically herein as a single entity, it is contemplated that the task database 206 may be implemented in a distributed manner.

Generally speaking, the task database 206 can be populated with digital tasks to be executed by at least some of the plurality of assessors 208. How the task database 206 is populated with the tasks is not limited. Generally speaking, one or more task requesters (not separately depicted) may submit one or more tasks to be stored in the task database 206. In some non-limiting embodiments of the present technology, the one or more task requesters may specify the type of assessors the task is destined to, and/or a budget to be allocated to each one of the plurality of assessors 208 providing a result.

For example, a given task requestor may have submitted, to the task database 206, a given digital task 214; and the server 202 may be configured to retrieve the given digital task 214 from the task database 206 and assign the given digital task to one of the plurality of assessors 208—such as the given assessor 212. Further, the server 202 may be configured to submit the given digital task 214 to the given assessor 212 by transmitting an indication of the given digital task 214, via the communication network 210, to a respective electronic device (not separately labelled) of the given assessor 212.

According to various non-limiting embodiments of the present technology, a respective electronic device (not separately labelled in FIG. 2) associated with the given assessor 212 of the plurality of assessors 208 may be a device including hardware running appropriate software suitable for executing a relevant task at hand (such as the given digital task 214), including, without limitation, one of a personal computer, a laptop, an a smartphone, as an example. To that end, the respective electronic device may include some or all the components of the computer system 100 depicted in FIG. 1.

Accordingly, to enable the given assessor 212 to receive digital tasks from the server 202 and provide answers thereto from their respective electronic device, in some non-limiting embodiments of the present technology, the server 202 can be configured to execute a crowdsourcing application (not depicted). For example, the crowdsourcing application may have a client-server architecture with most of its functionality executed at the server 202; and the given assessor 212 may have a respective user account with the crowdsourcing application allowing them to receive digital tasks from the server 202 and submit their answers thereto. In a specific non-limiting example, the crowdsourcing application may be implemented as a crowdsourcing platform such as Yandex.Toloka™ crowdsourcing platform, or other proprietary or commercially available crowdsourcing platform.

Further, in some non-limiting embodiments of the present technology, the given digital task 214 include an audio feed 216. For example, in some non-limiting embodiments of the present technology, the audio feed 216 may include a recording of a human voice utterance, and the given digital task 214 may be a classification task instructing the given assessor 212 to determine a user category producing the human voice utterance, such as a child, an adult, and the like. For example, an answer of the given assessor 212 to such a digital task my be used for generating a respective training set of data for further training an MLA to classify users of a given electronic device.

However, in other non-limiting embodiments of the present technology, the audio feed 216 associated with given digital task 214 may comprise a recording of a predetermined voice answer to be used in a given voice service application in response to one or more user requests. For example, the given voice service application may include a virtual assistant application configured for executing voice requests of a user of a given electronic device (such as a smart speaker, for example) running the virtual assistant application. For example, the virtual assistant application may be implemented as an ALISA™ virtual assistant application (provided by Yandex LLC of 16 Lev Tolstoy Street, Moscow, 119021, Russia); however other commercial or proprietary virtual assistant applications can also be envisioned without departing from the scope of the present technology.

Thus, in these embodiments, the given digital task 214 may include instructions for the given assessor 212, for example, to convert the predetermined voice answer to its text representation. In another example, the given digital task 214 may include instructions for the given assessor 212 to translate the predetermined voice answer into another language. Further, in yet another example, via the completion of the given digital task 214, the given assessor 212 may be invited to assess quality (such as using a respective quality scale, for example) of the recording, for example, in terms of amount of noise imposed thereon, clarity of pronunciation of the predetermined voice answer, and the like. In yet another example, the given digital task 214 may include instructions to determine correspondences between the predetermined voice answer and one or more user voice requests, in response to which the virtual assistant application may further be configured to generate the predetermined voice answer. It should be noted that the examples provided above are not an exhaustive list, and other examples of digital tasks in respect of the respective audio feed can also be envisioned without departing from the scope of the present technology.

Thus, in accordance with certain non-limiting embodiments of the present technology, after receiving the given digital task 214, using the crowdsourcing application, the given assessor 212 may provide answer thereto, which the respective electronic device of the given assessor 212 is configured to transmit to the server 202. However, providing access to the audio feed 216 associated with the given digital task 214 to the given assessor 212 may allow them to misuse the audio feed 216. For example, the given assessor 212 may record the audio feed 216 associated with the given digital task 214 using their personal electronic devices (not depicted). Further, the given assessor 212 may post the recorded audio feed on their private social network pages and/or forward the so recorded audio feed to someone else. As it can be appreciated, these actions can lead to unauthorized public disclosure of the audio feed 216 associated with the given digital task 214, which may further cause certain financial and reputational damages to the entity owning the virtual assistant application.

To that end, in accordance with certain non-limiting embodiments of the present technology, the server 202 may be configured to personalize the given digital task 214 for being executed by the given assessor 212. More specifically, before submitting the given digital task 214 to the given assessor 212, in some non-limiting embodiments of the present technology, the server 202 may be configured to add, to the audio feed 216 associated with the given digital task 214, an identity watermark indicating an identity of the given assessor 212 and thus allowing for further determination an association between them and the given digital task 214.

Thus, in some non-limiting embodiments of the present technology, the server 202 can be configured to (1) receive, from the assessor database 204, at least one indication of identity 218 of the given assessor 212 to whom the original audio feed of the given digital task 214 is destined to; (2) generate, based on the at least one indication of identity 218 of the given assessor 212, a respective identity watermark associated therewith to be added to the original audio feed of the given digital task 214; (3) receive, form the task database 206, the given digital task 214; (3) extract, from the given digital task 214, the audio feed 216; (4) add, in the audio feed 216, the respective identity watermark, thereby generating an augmented audio feed 220; and (5) include the augmented audio feed 220 in the given digital task 214, in lieu of the original audio feed 216, for transmission of the given digital task 214 to the given assessor 212 for completion.

Figure 3:
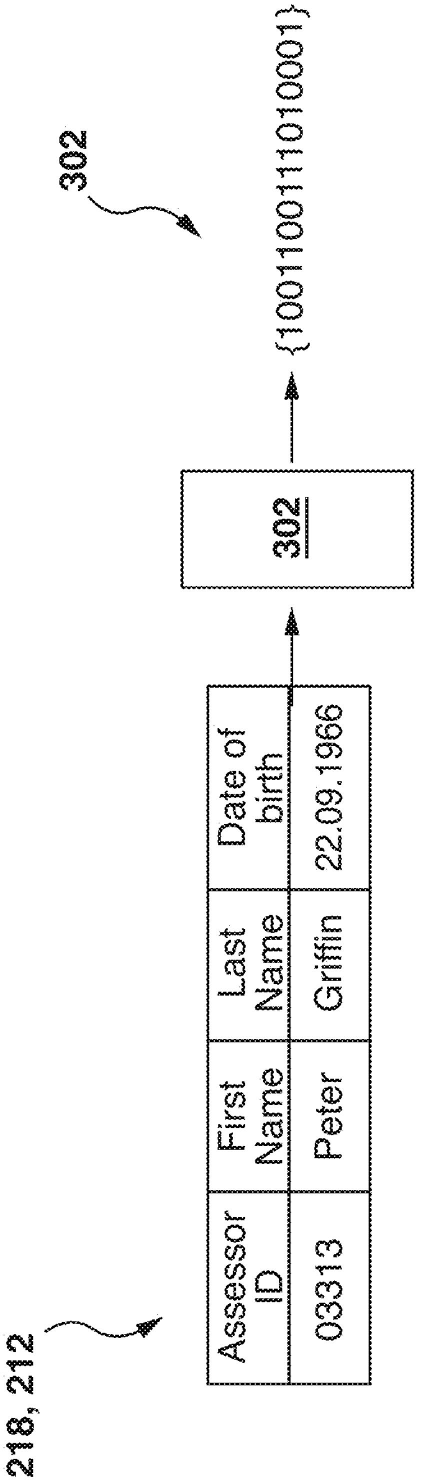
FIG. 3 depicts a schematic diagram of a process of generating, by a server present in the networked computing environment of FIG. 2, a binary sequence, based on indications of identity of the given assessor, which can further be used for generating the respective identity watermark, the respective identity watermark, in accordance with certain non-limiting embodiments.

In some non-limiting embodiments of the present technology, to add the respective identity watermark, first, the server 202 may be configured to represent the at least one indication of identity 218 of the given assessor 212, such as their name and a unique identifier, as noted above, or their login name at the crowdsourcing application, for example, as a unique binary sequence. To that end, for example, the server 202 may be configured to apply an encoding algorithm 302 as depicted in FIG. 3, in accordance with certain non-limiting embodiments of the present technology.

According to the non-limiting embodiments of the present technology, it is not limited how the encoding algorithm 302 is implemented; and in some non-limiting embodiments of the present technology, may include a lossless encoding algorithm, such as an arithmetic encoding algorithm, a Huffman encoding algorithm, a Shannon encoding algorithm, and the like. In other non-limiting embodiments of the present technology, the encoding algorithm 302 may include a lossy encoding algorithm, such as a linear predictive encoding algorithm, a Discrete Cosine Transform encoding algorithm, and the like.

Thus, the encoding algorithm 302 may be configured to generate, based on the at least indication of identity 218, a binary sequence 304 enabling to uniquely identify the given assessor 212 amongst other ones of the plurality of assessors 208. Although in the depicted embodiments, the binary sequence 304 has 16 bits, it should be expressly understood that in other non-limiting embodiments of the present technology, the binary sequence 304 may include 8 bits, 32 bits, or 64 bits, for example, without departing from the scope of the present technology.

Thus, in some non-limiting embodiments of the present technology, the server 202 can be configured to encode the binary sequence 304 into the audio feed 216, thereby adding thereto the respective identity watermark associated with the given assessor 212 and generating the augmented audio feed 220. Further, as will become apparent from the description hereinbelow, once the augmented audio feed 220 is reproduced, an augmented audio signal thereof may be captured by an electronic device configured to recognize the respective identity watermarks. Thus, in case where the given assessor 212 has misused the augmented audio feed 220 while executing the given digital task 214, their identity can be established and respective preventive measured against them can be taken, such as restricting access to their account with the crowdsourcing application, putting them on a blacklist of assessors, initiate legal proceedings against them, and the like.

How the server 202 can be configured to add the respective identity watermark to the audio feed 216, in accordance with certain non-limiting embodiments of the present technology, will be described below with referenced to FIGS. 4 to 6.

How the respective identity watermark can be recognized by an electronic device, in accordance with certain non-limiting embodiments of the present technology, will be described further below with referenced to FIGS. 7 to 10.

Communication Network

In some non-limiting embodiments of the present technology, the communication network 210 is the Internet. In alternative non-limiting embodiments of the present technology, the communication network 210 can be implemented as any suitable local area network (LAN), wide area network (WAN), a private communication network or the like. It should be expressly understood that implementations for the communication network are for illustration purposes only. How a respective communication link (not separately numbered) between each one of the server 202 and a given one of the electronic devices of the plurality of assessors 208 and the communication network 210 is implemented will depend, inter alia, on how each one of the server 202 and the given one of the electronic devices of the plurality of assessors 208 is implemented. Merely as an example and not as a limitation, in those embodiments of the present technology where the given one of the respective electronic devices of the plurality of assessors 208 is implemented as a wireless communication device such as a smart speaker, the communication link can be implemented as a wireless communication link. Examples of wireless communication links include, but are not limited to, a 3G communication network link, a 4G communication network link, and the like. The communication network 210 may also use a wireless connection with the server 202 and each one of the electronic devices of the plurality of assessors 208.

Generating an Identity Watermark in the Audio Feed

As mentioned hereinabove, to generate the augmented audio feed 220 for the given assessor 212, in some non-limiting embodiments of the present technology, the server 202 can be configured to generate the respective identity watermark in the audio feed 216, which may be represented by the binary sequence 304. In other words, to generate the augmented audio feed 220, the server 202 can be configured to modify energy levels of an initial audio signal of the audio feed 216 by encoding therein the binary sequence 304.

To that end, first, according to certain non-limiting embodiments of the present technology, the server 202 may be configured to generate a time-frequency representation of the initial audio signal associated with the audio feed 216. With reference to FIG. 4, there is depicted a schematic diagram for a process of generating, by the server 202, a time-frequency representation 404 associated with the audio feed 216, in accordance with certain non-limiting embodiments of the present technology.

In some non-limiting embodiments of the present technology, first, the server 202 can be configured to generate, an amplitude-time representation 402 of the initial audio signal associated with the audio feed 216. To that end, the server 202 may be configured to apply one or more sampling techniques to the initial audio signal. For example, however, without being limited to, the server 202 may be configured to use a sampling technique based on the Nyquist rate.

Further, in some non-limiting embodiments of the present technology, the server 202 can be configured to apply a Fourier transform to the amplitude-time representation 402 of the initial audio signal to generate the time-frequency representation 404 associated thereof. Generally speaking, applying the Fourier transform allows demonstrating how frequency components of a given audio signal (such as that of the initial audio signal associated with the audio feed 216, for example) vary over time.

In some non-limiting embodiments of the present technology the Fourier transform may include a Discrete Fourier Transform (DFT). How the server 202 may be configured to compute the DFT is not limited and, in various embodiments of the present technology, may include applying one of a Fast Fourier Transform (FFT) algorithm family further including a Prime Factor FFT algorithm, a Bruun's FFT algorithm, a Rader's FFT algorithm, a Bluestein's FFT algorithm, and a Hexagonal FFT, as an example.

It should further be noted that in order to generate time-frequency representation 404 of the initial audio signal, the server 202 may also be configured to apply other discrete transforms thereto including, without limitation: a Generalized DFT, a Discrete-space Fourier transform, a Z-transform, a Modified discrete cosine transform, a Discrete Hartley transform, and the like.

In some non-limiting embodiments of the present technology, the server 202 can be configured to apply the Fourier transform to the amplitude-time representation 402 using a stacked time window approach. More specifically, the server 202 can be configured to segment the amplitude-time representation 402 into a plurality of portions thereof based on a predetermined time window 406 Δt. Further, the server 202 can be configured to apply the Fourier transform to each of the plurality of portions corresponding to a duration of the predetermined time window 406.

It should be noted that it is not limited how the duration of the predetermined time window 406 is determined, and in some non-limiting embodiments of the present technology, the duration of the predetermined time window 406 for the audio feed 216 can be selected based on a trade-off between the time resolution and the frequency resolution of the time-frequency representation 404, such as the "narrower" the predetermined time window 406 is, the better the time resolution is and the worse the frequency resolution is of the time-frequency representation 404 associated with the audio feed 216, and vice versa.

Further, in some non-limiting embodiments of the present technology, the server 202 can be configured to modify the time-frequency representation 404 in accordance with the binary sequence 304, thereby adding therein the respective identity watermark associated with the given assessor 212.

For example, in accordance with certain non-limiting embodiments of the present technology, the server 202 may be configured to encode a respective value of each bit of the binary sequence 304 in the time-frequency representation 404 by modifying the initial audio signal to have a respective predetermined energy level at a respective single predetermined frequency level within at least one instance of the predetermined time window 406.

However, in other non-limiting embodiments of the present technology, for a given bit of the binary sequence 304, the server 202 can be configured to determine a respective set of predetermined frequency levels where a first one thereof is used for indicating a value of the given bit; and other ones of the respective set of predetermined frequency levels are for replicating the value of the given bit indicated by the first one. To that end, the server 202 can further be configured to modify the initial audio signal of the audio feed 216 to have the respective predetermined energy level at each one of the respective set of predetermined frequency levels, within the at least one instance of the predetermined time window 406. Such an approach to replicating the value of the given bit of the binary sequence 304 within the time-frequency representation 404 may allow increasing the robustness of the so generated respective identity watermark to various types of noise that can be imposed on the audio signal of the augmented audio feed 220 during the transmission, receipt, and conversion thereof.

For example, the respective set of predetermined frequency levels may include at least two frequency levels, each of which is different from each other. It should be expressly understood that it is not limited how the server 202 can be configured to determine each one of the at least two frequency levels for indicating a value of the given bit of the binary sequence 304. For example, in some non-limiting embodiments of the present technology, the server 202 can be configured to select each one of the at least two frequency levels from a predetermined audio spectrum. In some non-limiting embodiments of the present technology, the predetermined audio spectrum may be an audio spectrum recognizable by the human ear, such as from around 20 Hz to around 20 000 Hz. However, in other non-limiting embodiments of the present technology, other audio spectrums, such as an infrasound spectrum spanning from around 0 Hz to around 20 Hz or an ultrasound spectrum spanning from about 20 000 Hz to around 200 000 Hz as well as specific audio spectra including, at least partially, some of the audio spectra mentioned above, can also be envisioned without departing from the scope of the present technology.

Further, in some non-limiting embodiments of the present technology, the server 202 can be configured to select each one of the at least two frequency levels associated with the given bit within the predetermined audio spectrum randomly—such as based on a predetermined distribution (for example, normal distribution) of frequency levels within the time-frequency representation 404 associated with the audio feed 216. However, in other non-limiting embodiments of the present technology, each one of the at least two different frequency levels can be pre-selected for the given bit of the binary sequence 304, such as prior to the server 202 starting to modify the audio feed 216. In these embodiments, each one of the at least two frequency levels may also be randomly pre-selected from a pre-determined distribution of frequency levels within a plurality of audio feeds, as an example.

In yet other non-limiting embodiments of the present technology, the server 202 can be configured to select the other one of the at least two frequency levels as being spaced from the first one of the at least two frequency levels at a predetermined step. For example, in some non-limiting embodiments of the present technology, the predetermined step may be 0.1 Hz, 20 Hz, 400 Hz, or 1300 Hz.

In yet other non-limiting embodiments of the present technology, the server 202 can be configured to select each one of the two frequency levels associated with the given bit from a respective sub-range of the predetermined audio spectrum. For example, the server 202 can be configured to select a first one of the at least two frequency levels from a lower sub-range of the predetermined audio spectrum; and select an other one of the at least two frequency levels from a higher sub-range of the predetermined audio spectrum, and the like. For example, in those embodiments of the present technology where the predetermined audio spectrum is the audio spectrum recognizable by the human ear, the first one of the at least two frequency levels can be selected from a sub-range from around 20 Hz to around 100 Hz; and the other one of the at leas two frequency levels can be selected from a sub-range from around 1000 Hz to around 20 000 Hz. In yet other non-limiting embodiments of the present technology, as will be come apparent from the description provided below, the server 202 can be configured to select the other one of the at least two frequency levels such that the initial audio signal of the audio feed 216 has a same amplitude value (or otherwise, within predetermined variations thereof, such as ±5 dB, for example) thereat as at the first one of the at least two frequency levels.

It should be noted that other techniques of determining frequency levels for the respective set of predetermined frequency levels for indicating the given bit of the binary sequence 304, such as based on a predetermined function, for example, can also be envisioned without departing from the scope of the present technology.

It should further be noted that in those embodiments where a given one of the at least two frequency levels is not available, or, in other words, is not present in a frequency spectrum of the initial audio signal, to indicate the given bit of the binary sequence 304, the server 202 can be configured to add respective predetermined portions to the initial audio signal, thereby filling in a gap corresponding to the given one of the at least two frequency levels. However, in other non-limiting embodiments of the present technology, the server 202 can be configured to select the at least two frequency levels only out of those forming the frequency spectrum of the initial audio signal of the audio feed 216.

Also, it should be expressly understood that indicating the given bit of the binary sequence 304 by a set of separate frequency levels is described herein only for purposes of clarity of explanation of the present technology; and in some non-limiting embodiments of the present technology, the server 202 can be configured to indicate the given bit of the binary sequence 304 by a respective set of frequency bands, wherein each frequency band has a predetermined bandwidth, such as 5 Hz, 10 Hz, or 25 Hz, for example.

Figure 4:
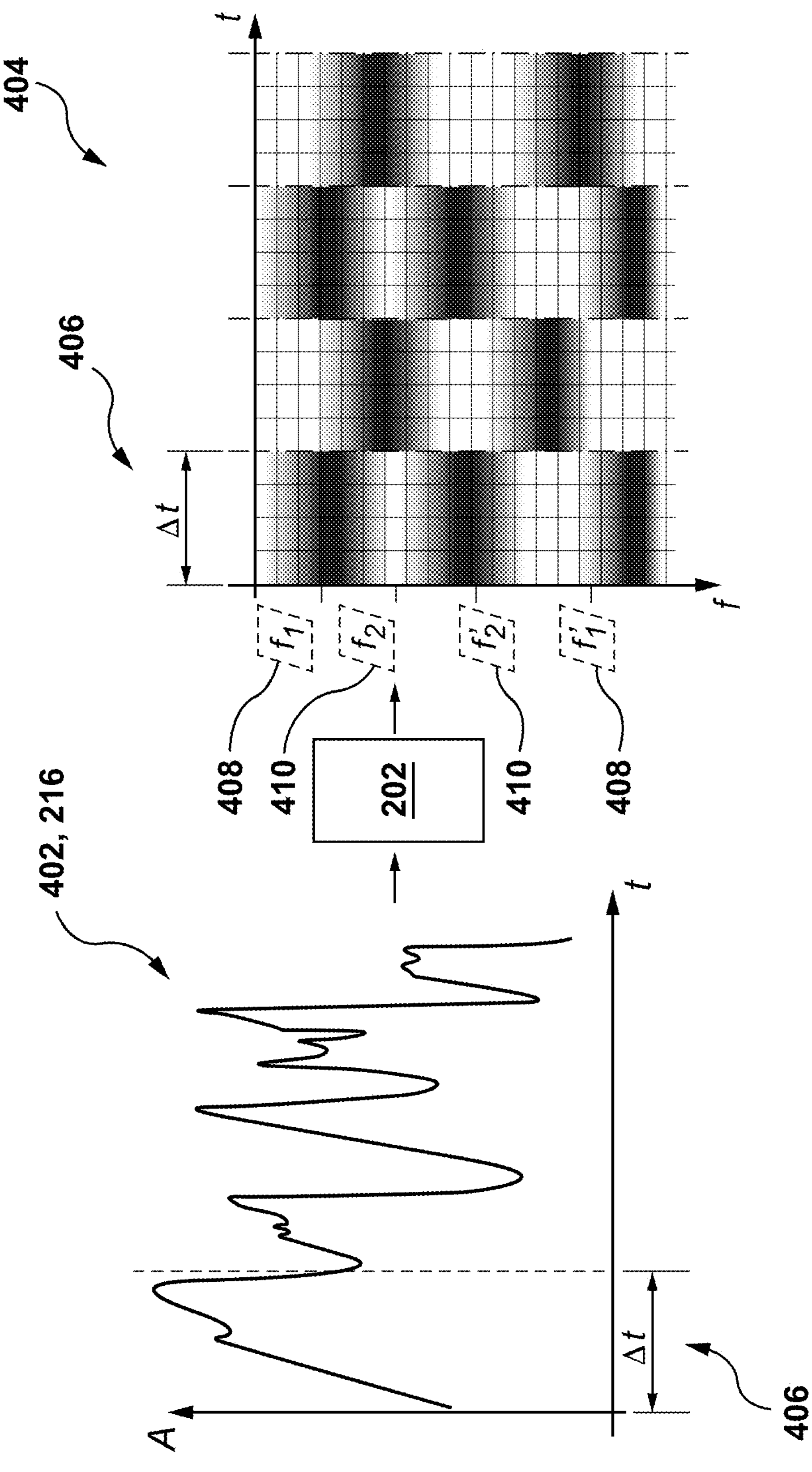
FIG. 4 depicts a schematic diagram of a step of generating, by the server present in the networked computing environment of FIG. 2, a time-frequency representation of an audio signal associated with the audio feed for augmentation thereof with the respective identity watermark of the given assessor, in accordance with certain non-limiting embodiments of the present technology.

Thus, by way of example, as it can be appreciated from FIG. 4, the server 202 can be configured to determine (i) a first set of frequency levels 408 for indicating, in the time-frequency representation 404 associated with the audio feed 216, a first bit of the binary sequence 304 having a value of '1', for example; and (ii) a second set of frequency levels 410 for indicating a second bit of the binary sequence 304 having a value of '0', for example. As it can further be appreciated, each one of the first set of frequency levels 408 and the second set of frequency levels 410 include at least two different frequency levels, that is, $f_1$, $f'_1$ and $f_2$, $f'_2$, respectively.

Further, according to some non-limiting embodiments of the present technology, to indicate the values of each one of the first bit and the second bit of the binary sequence 304 in the audio feed 216, the server 202 can be configured to modify the initial audio signal such that it has a respective predetermined energy level at each one of the first set of frequency levels 408 and the second set of frequency levels 410 thereof within the at least one instance of the predetermined time window 406. To that end, in some non-limiting embodiments of the present technology, the server 202 can be configured to modulate an amplitude of the initial audio signal at each one of the first set of frequency levels 408 and the second set of frequency levels 410 to have a respective predetermined value thereof.

For example, to indicate the value of '1' of the first bit of the binary sequence 304 in the audio feed 216, the server 202 can be configured to modulate the amplitude of the initial audio signal, within the at least one instance of the predetermined time window 406, to have, at each one of the first set of frequency levels 408, a first predetermined amplitude value, such as 30 or 50 dB, for example. However, in other non-limiting embodiments of the present technology, the server 202 can be configured to modify the initial audio signal to have a respective amplitude value at each one of the first set of frequency levels not less than the first predetermined amplitude value. In yet other non-limiting embodiments of the present technology, to indicate the value of '1' of the first bit of the binary sequence 304, the server 202 can be configured to modify the initial audio signal to have a non-zero respective amplitude value at each one of the first set of frequency levels 408, within the at least one instance of the predetermined time window 406.

Further, in accordance with certain non-limiting embodiments of the present technology, to indicate the value of '0' of the second bit of the binary sequence 304, the server 202 can be configured to modulate the amplitude of the initial audio signal such that it has a second predetermined amplitude value (such as 10 or 20 dB, for example) at each one of the second set of frequency levels 410, within the at least one instance of the predetermined time window 406. Similarly, in other non-limiting embodiments of the present technology, the server 202 can be configured to modify the initial audio signal to have the amplitude at each one of the second set of frequency levels 410 not greater than the second predetermined amplitude value to indicate the '0' value of the second bit.

In specific non-limiting embodiments of the present technology, the server 202 can be configured to indicate the value of '0' of the second bit of the binary sequence 304 by a zero energy level of the initial audio signal of the audio feed 216 at each one of the second set of frequency levels 410, within the at least one instance of the predetermined time window 406. To that end, in some non-limiting embodiments of the present technology, the server 202 can be configured to exclude respective portions of the initial audio signal corresponding to each one of the second set of frequency levels 410.

In some non-limiting embodiments of the present technology, to exclude a respective portion of the initial audio signal corresponding to a given one of the second set of frequency levels 410, the server 202 can be configured to apply a respective notch filter to the initial audio signal.

Broadly speaking, a notch filter (also referred to as a "band-stop filter") is a signal processing filter configured to remove (or otherwise exclude) a portion of a given signal (such as the initial audio signal of the audio feed 216) at a specific predetermined frequency level, which may be represented, in a respective time-frequency representation of the given signal, by a respective gap corresponding to the specific predetermined frequency level.

Thus, the server 202 can be configured to apply the respective notch filter to the initial audio signal of the audio feed 216 to "cut out", within the at least one instance of the predetermined time window 406, portions of the initial audio signal corresponding to each one of the second set of frequency levels 410 encoding the second bit of the binary sequence 304, as depicted in FIG. 4. Accordingly, so excluded portions of the initial audio signal form therein a respective sound gap when it is reproduced.

It should be noted that the server 202 may be configured to modulate certain parameters of the respective identity watermark to be added to the initial audio signal such that the respective sound gap formed therein could be substantially unrecognizable by the human ear. For example, the server 202 can be configured to execute at least one of: modulating (such as decreasing) the size of the predetermined time window 406, decreasing a number of frequency levels for encoding the value of the second bit in the time-frequency representation 404 of the initial audio signal, sampling frequency levels for the second set of frequency levels from the sub-ranges of the predetermined audio spectrum including frequency levels poorly perceivable by the human ear, and the like. In this regard, in some non-limiting embodiments of the present technology, the respective set of predetermined frequency levels for indicating the value of '0' of the given bit may have fewer predetermined frequency levels than that for indicating the value of '1'.

In some non-limiting embodiments of the present technology, to apply the respective notch filter, the server 202 can be communicatively coupled to an analogue configuration (not depicted) thereof. In these embodiments, the respective notch filter may be implemented as an electronic circuit configured to filter out the given one of the second set of frequency levels 410. In a specific non-limiting example, the respective notch filter can be one of the types available from TEXAS INSTRUMENTS INC. of 12500 TI Blvd., Dallas, Texas 75243 USA. However, it should be expressly understood that the desktop scanner can be implemented in any other suitable equipment.

In other non-limiting embodiments of the present technology, the server 202 can be configured, by executing respective instructions, to apply a digital configuration of the respective notch filter, whereby the server 202 is configured to apply respective mathematical operations to the initial audio signal that are equivalent to the applying the analogue configuration of the respective notch filter.

Thus, by modifying the initial audio signal of the audio feed 216 at other respective sets of frequency levels to indicate therein respective values of each other bit of the binary sequence 304 as described hereinabove in respect of the first bit and the second bit thereof, the server 202 can be configured to include the respective identity watermark associated with given assessor 212.

Further, based on the time-frequency representation 404 of the initial audio signal so modified to include the respective identity watermark of the given assessor 212, the server 202 can be configured to generate the augmented audio signal of the augmented audio feed 220.

Figure 5:
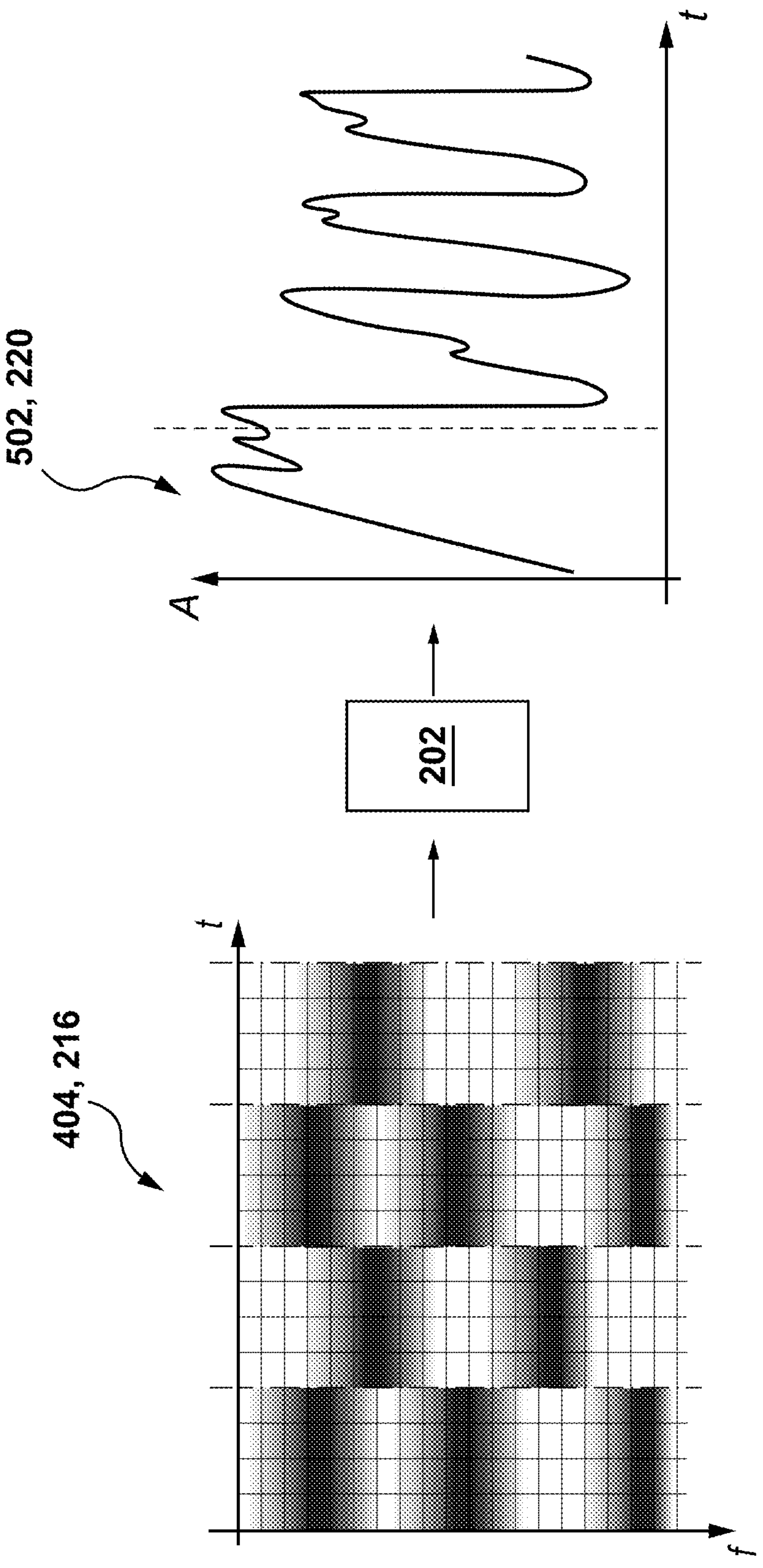
FIG. 5 depicts a schematic diagram of a step for generating, by the server present in the networked computing environment of FIG. 2, an amplitude-time representation of an audio signal of the augmented audio feed of FIG. 4 to be transmitted to the given assessor, in accordance with certain non-limiting embodiments of the present technology.
Figure 6:
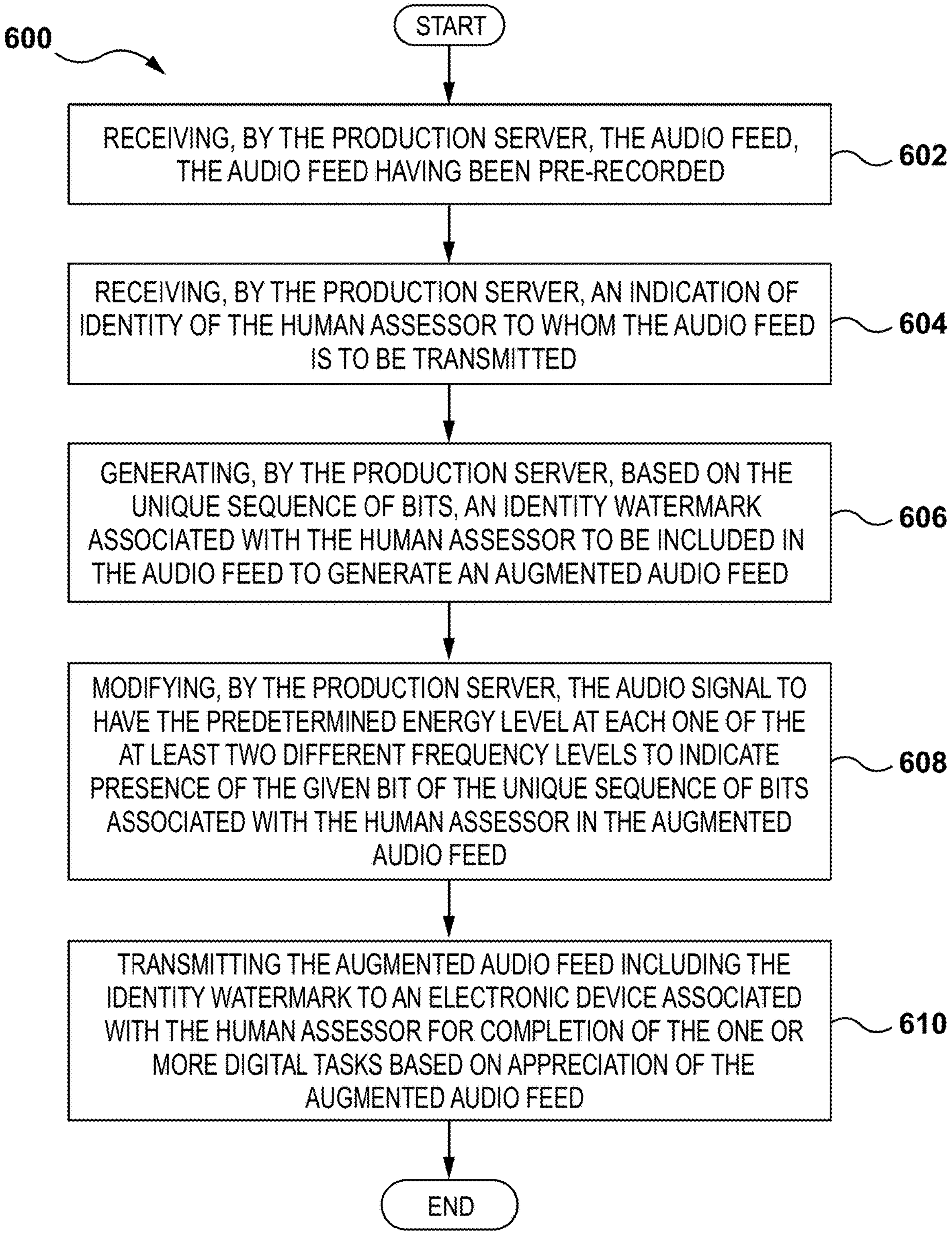
FIG. 6 depicts a flowchart of a method for augmenting, by the server present in the networked computing environment of FIG. 2, the audio feed to be transmitted to the given assessor, in accordance with certain non-limiting embodiments of the present technology.

With reference to FIG. 5, there is depicted a schematic diagram of a process for generating, by the processor, an augmented amplitude-time representation 502 of the augmented audio signal associated with the augmented audio feed 220, in accordance with certain non-limiting embodiments of the present technology.

In some non-limiting embodiments of the present technology, the server 202 can be configured to apply an Inverse Fourier Transform to the time-frequency representation 404 associated with the audio feed 216. For example, the server 202 can be configured to apply an Inverse DFT to the time-frequency representation 404 within each instance of the predetermined time window 406 thereof to generate the augmented amplitude-time representation 502 associated with the augmented audio feed 220.

Thus, as described above with reference to FIG. 2, the so generated augmented audio feed 220 can further be included in the given digital task 214 for personalization thereof to be executed by the given assessor 212. As further mentioned above, when the augmented audio feed 220 is reproduced, the respective identity watermark can be detected, for example, by an electronic device, thereby determining the association between the given assessor 212 and the augmented audio feed 220.

First Method

Given the architecture and the examples provided hereinabove, it is possible to execute a method for augmenting an audio feed to be provided to a human assessor, such as personalizing the audio feed 216 to be transmitted to the given assessor 212 as part of the given digital task 214. With reference to FIG. 6, there is depicted a flowchart of a first method 600, according to the non-limiting embodiments of the present technology. The first method 600 can be executed by the server 202.

Step 602: Receiving, by the Production Server, the Audio Feed, the Audio Feed Having been Pre-Recorded The first method 600 commences at step 602 where the server 202 can be configured to receive a given audio feed for adding therein the respective identity watermark associated with the given assessor 212. For example, in some non-limiting embodiments of the present technology, the server 202 can be configured to receive the given audio feed that has been pre-recorded for executing, by the given assessor 212, a respective digital task at the crowdsourcing application as described above—such as the audio feed 216 of the given digital task 214.

The first method thus proceeds to step 604.

Step 604: Receiving, by the Production Server, an Indication of Identity of the Human Assessor to Whom the Audio Feed is to be Transmitted Further, at step 604, according to some non-limiting embodiments of the present technology, the server 202 can be configured to receive at least one indication of identity of the given assessor 212. As described above with reference to FIGS. 2 and 3, the at least one indication of identity of the given assessor 212 may include, without limitation, their name and a respective unique identifier, their login name at the crowdsourcing application, and the like.

Further, in some non-limiting embodiments of the present technology, based on the at least one indication of identity, as described above with reference to FIG. 3, the first electronic device 702 can be configured to generate the binary sequence 304 uniquely identifying the given assessor 212 amongst each other one of the plurality of assessors 208.

The first method thus advances to step 606.

Step 606: Generating, by the Production Server, Based on the Unique Sequence of Bits, an Identity Watermark Associated With the Human Assessor to be Included in the Audio Feed to Generate an Augmented Audio Feed At step 606, according to certain non-limiting embodiments of the present technology, the server 202 can be configured to encode the binary sequence 304 in the audio feed 216, thereby generating the augmented audio feed 220 personalized for the given assessor 212.

To that end, as described above with reference to FIG. 4, the server 202 can be configured to generate the time-frequency representation 404 of the initial audio signal of the audio feed 216. For example, the server 202 can be configured to apply the Fourier transform to the amplitude-time representation 402 of the initial audio signal. In some non-limiting embodiments of the present technology, the server 202 can be configured to apply the Fourier transform in the stacked window approach with the predetermined time window 406, as mentioned further above.

Further, the server 202 can be configured to determine frequency levels for indicating respective values of bits of the binary sequence 304 in the initial audio signal of the audio feed 216. For example, in some non-limiting embodiments of the present technology, for indicating the value of the given bit of the binary sequence 304, the server 202 can be configured to determine the respective set of predetermined frequency levels, including at least two different frequency levels, where the first one thereof is used for indicating the value of the given bit; and the others are for replicating the value of the given bit indicated by the first one—such as the first set of frequency levels 408 and the second set of frequency levels 410 used for indicating the first and second bits of the binary sequence 304 in the time-frequency representation 404 of the initial audio signal associated with the audio feed 216.

As further described above with reference to FIG. 4, in some non-limiting embodiments of the present technology, the server 202 can be configured to determine each one of the respective set of predetermined frequency levels randomly. In other non-limiting embodiments of the present technology, each one of the respective set of predetermined set of frequency levels can be randomly predetermined prior to receiving, by the server 202, the audio feed 216. In yet other non-limiting embodiments of the present technology, each one of the respective set of predetermined set of frequency levels can be determined based on the predetermined step, as described above.

In some non-limiting embodiments of the present technology, the server 202 can be configured to select each respective set of predetermined frequency levels from the predetermined audio spectrum—such as the audio spectrum recognizable by the human ear, as described further above.

The first method 600 hence advances to step 608.

Step 608: Modifying, by the Production Server, the Audio Signal to have the Predetermined Energy Level at Each One of the at Least Two Different Frequency Levels to Indicate Presence of the Given Bit of the Unique Sequence of Bits Associated with the Human Assessor in the Augmented Audio Feed At step 608, the server 202 can be configured to modify the initial audio signal, such as using the time-frequency representation 404 thereof, to have a respective predetermined energy level at each one of the respective set of frequency levels, to indicate the value of the given bit of the binary sequence 304 in the audio feed 216.

For example, as described above, to indicate the value of '1' of the first bit of the binary sequence 304 in the audio feed 216, the server 202 can be configured to modulate the amplitude of the initial audio signal, within the at least one instance of the predetermined time window 406 of the time-frequency representation 404, to have, at each one of the first set of frequency levels 408, a first predetermined amplitude value, such as or 50 dB, for example. However, in other non-limiting embodiments of the present technology, the server 202 can be configured to modify the initial audio signal to have a respective amplitude value at each one of the first set of frequency levels not less than the first predetermined amplitude value. In yet other non-limiting embodiments of the present technology, to indicate the value of '1' of the first bit of the binary sequence 304, the server 202 can be configured to modify the initial audio signal to have a non-zero respective amplitude value at each one of the first set of frequency levels 408, within the at least one instance of the predetermined time window 406 of the time-frequency representation 404.

Further, in accordance with certain non-limiting embodiments of the present technology, to indicate the value of '0' of the second bit of the binary sequence 304, the server 202 can be configured to modulate the amplitude of the initial audio signal such that it has a second predetermined amplitude value (such as 10 or 20 dB, for example) at each one of the second set of frequency levels 410, within the at least one instance of the predetermined time window 406. Similarly, in other non-limiting embodiments of the present technology, the server 202 can be configured to modify the initial audio signal to have the amplitude at each one of the second set of frequency levels 410 not greater than the second predetermined amplitude value to indicate the '0' value of the second bit.

In specific non-limiting embodiments of the present technology, the server 202 can be configured to indicate the value of '0' of the second bit of the binary sequence 304 by a zero energy level of the initial audio signal of the audio feed 216 at each one of the second set of frequency levels 410, within the at least one instance of the predetermined time window 406 of the time-frequency representation 404. To that end, in some non-limiting embodiments of the present technology, the server 202 can be configured to exclude respective portions of the initial audio signal corresponding to each one of the second set of frequency levels 410.

In some non-limiting embodiments of the present technology, to exclude a respective portion of the initial audio signal corresponding to a given one of the second set of frequency levels 410, the server 202 can be configured to apply the respective notch filter to the initial audio signal, as described above.

As further described above, the server 202 can be configured to exclude the respective portion of the initial audio signal for indicating the value of the second bit such that the so formed sound gap therein would not be recognized by the human ear.

Thus, by determining for each bit of the binary sequence 204, the respective set of predetermined frequency levels and modifying energy levels of the initial audio signal thereat as described above, the server 202 can be configured to generate the augmented audio feed 220.

The first method 600 thus proceeds to step 610.

Step 610: Transmitting the Augmented Audio Feed Including the Identity Watermark to an Electronic Device Associated with the Human Assessor for Completion of the One or More Digital Tasks Based on Appreciation of the Augmented Audio Feed At step 610, the server 202 can be configured to include the augmented audio feed 220 in the given digital task 214 in lieu of the audio feed 216 for transmission of the given digital task to the given assessor 212 for completion.

The first method 600 thus terminates.

Thus, certain embodiments of the method 600 allow generating personalized audio feeds forming part of respective digital tasks to be executed by respective human assessors, such as those of the plurality of assessors 208. The respective identity watermarks in the so personalized audio feeds can further be recognized when the audio feeds are reproduced, and assessors having purportedly misused the audio feeds resulted in public access thereto can further be identified. Further, as mentioned above, certain measures against the identified assessors directed to preventing further damage to the entity owning the audio feeds can hence be taken.

How the so personalized audio feed, such as the augmented audio feed 220, can be recognized by an electronic device, in accordance with certain non-limiting embodiments of the present technology, will now be described.

Detecting the Identity Watermark

Figure 7:
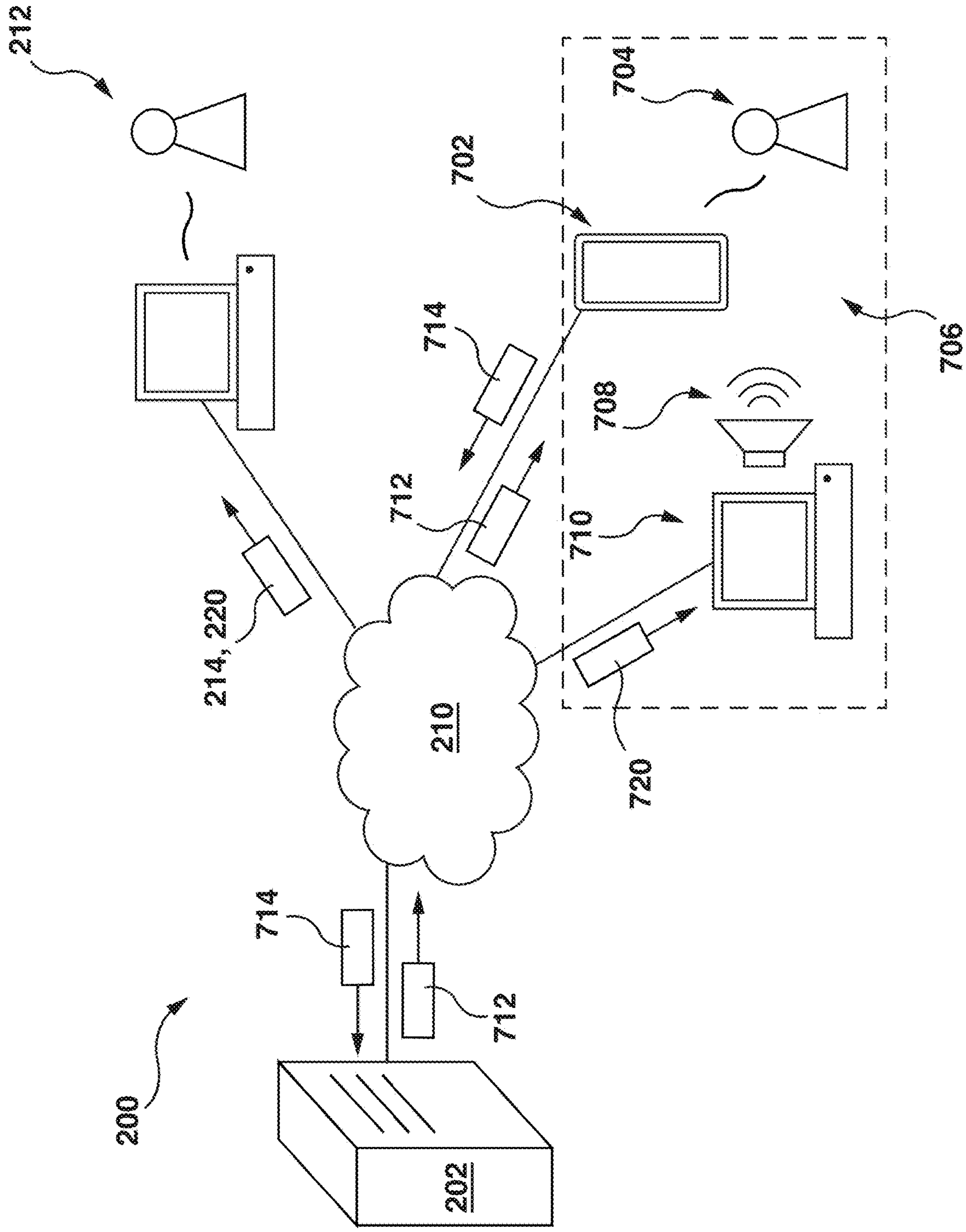
FIG. 7 depicts a schematic diagram of another implementation of the networked computing environment of FIG. 2 suitable for determining an association between the given assessor thereof and an in-use audio feed reproduced in a vicinity of an electronic device, in accordance with certain non-limiting embodiments of the present technology.

With reference to FIG. 7, there is depicted another implementation of the networked computing environment 200 suitable for determining association between one of the plurality of assessors 208 and a given in-use audio feed 720, in accordance with certain non-limiting embodiments of the present technology.

As it can be appreciated from FIG. 7, the server 202 can further be communicatively coupled, via the communication network 210, to a first electronic device 702, which, for example, can be associated with a user 704.

According to certain non-limiting embodiment of the present technology, the first electronic device 702 can be configured to determine association between audio feeds reproduced in a vicinity 706 thereof and each one of the plurality of assessors 208, such as the given assessor 212. More specifically, the first electronic device 702 can be configured to determine if the given in-use audio feed 720 reproduced in the vicinity 706 of the first electronic device 702 has been personalized for the given assessor 212—such as the augmented audio feed 220, as described above—by determining presence therein of the respective identity watermark associated with the given assessor 212.

As noted hereinabove, the given assessor 212 may provide public access to the augmented audio feed 220, for example, by at least one of (1) recording the augmented audio feed 220 using their personal electronic devices; (2)

copying digital files of the augmented audio feed 220 to their private electronic devices; and (3) sending the so obtained copies of the augmented audio feed 220 to third persons and/or entities, such as by posting thereof at open public web resources, for example, social networks (not depicted).

To that end, to enable the first electronic device 702 to determine if the given in-use audio feed 720 includes the respective identity watermark associated with one of the plurality of assessors 208, the server 202 can be configured to provide the first electronic device 702 with a first data packet 712 including data of the respective identity watermarks associated with each one of the plurality of assessors 208, which the first electronic device 702 can be configured to store in its local memory (such as one of the solid-state drive 120 and the random-access memory 130 of the computer system 100 thereof) for further use. For example, in some non-limiting embodiments of the present technology, the data of the respective identity watermark associated with the given assessor 212 received in the first data packet 712 may include, without limitation, at least one of: (i) the binary sequence 304 representative of the at least one indication of identity of the given assessor 212; (ii) an indication of respective sets of frequency levels used for indicating each of bit of the binary sequence 304—such as the first set of frequency levels 408 and the second set of frequency levels 410 used for indicating the first and second bits of the binary sequence 304, respectively, as described above with reference to FIG. 4; and (iii) an indication of respective predetermined energy levels for indicating each bit of the binary sequence 304 at each one of the respective sets of frequency levels. How the first electronic device 702 can be configured to determine the presence of the respective identity watermark in the given audio feed 720 based on the data provided from the server 202 in the first data packet 712 will be described below.

In some non-limiting embodiments of the present technology, the first electronic device 702 can be implemented similar to the respective assessor electronic device of the given assessor 212; and as such include one of a personal computer, a smartphone, and the like, further including some or all components of the computer system 100 depicted in FIG. 1.

Further, in some non-limiting embodiment of the present technology, the in-use given in-use audio feed 720 can be reproduced in the vicinity 706 of the first electronic device 702 by a second electronic device 710 communicatively coupled to the communication network 210. For example, the second electronic device 710 can be configured to receive digital files of the given in-use audio feed 720 from the communication network 210 and reproduce it using a speaker thereof (not separately labelled). Thus, it is not limited how the second electronic device 710 is implemented; and in some non-limiting embodiments of the present technology, the second electronic device 710 may implemented similar to the first electronic device 702 and comprise, for example, one of a laptop, a personal computer, a smartphone, a TV set, and the like. To that end, the second electronic device 710 may also include some or all components of the computer system 100 depicted in FIG. 1.

In specific non-limiting embodiments of the present technology, the user 704 of the first electronic device 702 can be the given assessor 212. In these embodiments, the first electronic device 702 can be a private electronic device of the given assessor 212, and the second electronic device 710 can be the respective electronic device thereof dedicated to the completing incoming digital tasks—such as the given digital task 214, as described above with reference to FIG. 2.

However, it should be noted that in other non-limiting embodiment of the present technology, the first electronic device 702 and the second electronic device 710 may not be associated with one and the same user. To that end, in some non-limiting embodiments of the present technology, the server 202 can be configured to transmit, to the first electronic device 702, the first data packet 712 including data of respective identity watermarks associated with each one of the plurality of assessors 208, presence of which the first electronic device 702 can be configured to consecutively determine in each in-use audio feed reproduced in the vicinity 706 thereof, such as the given in-use audio feed 720, as will be described below.

Thus, by reproducing the given audio feed 720, the second electronic device 710 can be configured to generate, in the vicinity 706 of the first electronic device 702, an in-use audio signal 708. In this regard, to determine if the given audio feed 720 has been personalized for the given assessor 212, in some non-limiting embodiments of the present technology, the first electronic device 702 can be configured to: (1) capture the in-use audio signal 708, for example, by using a built-in microphone (not depicted); (2) analyze, based on the data from the first data packet 712, the in-use audio signal 708 to determine the presence therein of the respective identity watermark associated with the given assessor 212; and (3) in response to the determining the presence of the respective identity watermark, determine the association between the given audio feed 720 and the given assessor 212.

Figure 8:
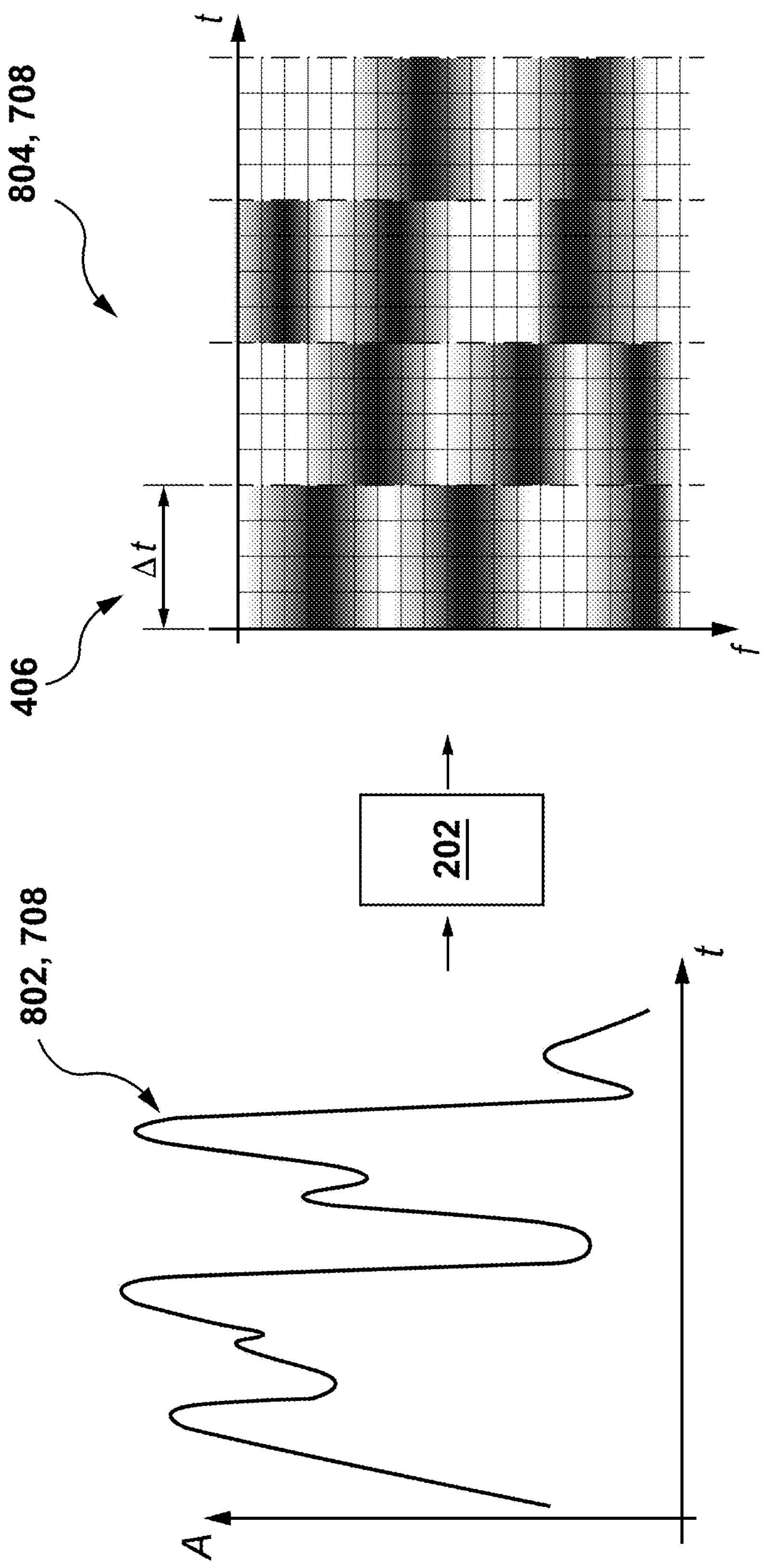
FIG. 8 depicts a schematic diagram of a step for generating, by the electronic device present in the networked computing environment of FIG. 7, a time-frequency representation of an audio signal associated with the in-use audio feed, in accordance with certain non-limiting embodiments of the present technology.

According to certain non-limiting embodiments of the present technology, to analyze the in-use audio signal 708, first, the first electronic device 702 can be configured to generate a time-frequency representation thereof. With reference to FIG. 8, there is depicted a schematic diagram of a process for generating, by the first electronic device 702, an in-use time-frequency representation 804 of the in-use audio signal 708, in accordance with certain non-limiting embodiments of the present technology.

In some non-limiting embodiments of the present technology, the first electronic device 702 can be configured to generate the in-use time frequency representation 804 in a fashion similar to that in which the server 202 is configured to generate the time-frequency representation 404 of the initial audio signal associated with the audio feed 216 as described above with reference to FIG. 4. More specifically, the first electronic device 702 can be configured to (1) generate an in-use amplitude-time representation 802 of the in-use audio signal 708; and (2) apply the Fourier Transform to the in-use amplitude-time representation 802, thereby generating the in-use time-frequency representation 804 of the in-use audio signal 708.

In some non-limiting embodiments of the present technology, the first electronic device 702 can be configured to apply to the in-use amplitude-time representation 802 a same configuration of the Fourier transform as the server 202 has applied to the amplitude-time representation 402 to generate the time-frequency representation 404 of the initial audio signal associated with the audio feed 216. For example, in those embodiments where the server 202 has applied the Fourier transform to the amplitude-time representation 402 in the stacked window approach, as described above with reference to FIG. 4, the first electronic device 702 can also be configured to apply the Fourier transform to the in-use amplitude-time representation 802 using the stacked window approach. Further, in these embodiments, the first electronic device 702 can be configured to apply the Fourier transform in the stacked window approach using a same size of the predetermined time window 406 as used by the server 202. However, a different size of the predetermined time window 406 or even a different configuration of the Fourier transform for use in generating the in-use time-frequency representation 804 can also be envisioned without departing from the scope of the present technology.

Further, using the in-use time-frequency representation 804, the first electronic device 702 can be configured to determine the presence of the respective identity watermark associated with the given assessor 212 in the given in-use audio feed 720. To that end, in some non-limiting embodiments of the present technology, the first electronic device 702 can be configured to determine energy levels of the in-use audio signal 708 at frequency levels thereof, which were used, for example, for indicating bits of the binary sequence 304 associated with the given assessor 212 in the augmented audio feed 220.

Figure 9:
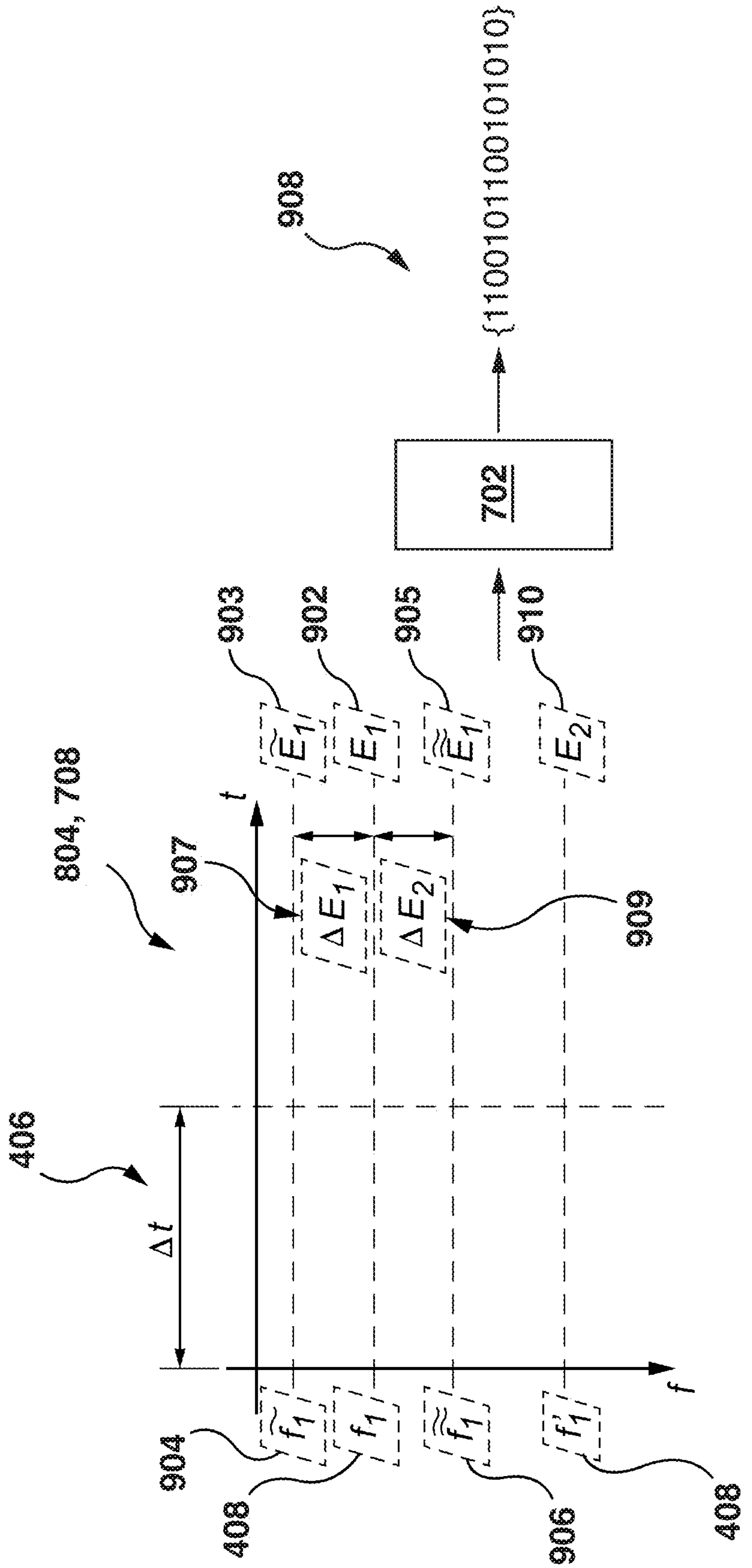
FIG. 9 depicts a schematic diagram of a process for determining, by the electronic device of the networked computing environment of FIG. 7, presence of the respective identity watermark in the in-use audio feed, in accordance with certain non-limiting embodiments of the present technology.

With reference to FIG. 9, there is depicted a schematic diagram of a step for the determining, by the first electronic device 702, the presence of the respective identity watermark associated with the given assessor 212 in the given in-use audio feed 720, in accordance with certain non-limiting embodiments of the present technology.

More specifically, to determine presence of the given bit of the binary sequence 304 in the given in-use audio feed 720, the first electronic device 702 can be configured to determine respective energy levels of the in-use audio signal 708 at each one of the at least two frequency levels thereof used for indicating the value of the given bit in the respective identity watermark associated with the give assessor 212. In other words, the first electronic device 702 can be configured to determine if the respective energy levels of the in-use audio signal 708 at each one of the at least two frequency levels thereof correspond to those used, by the server 202, for indicating the value of the given bit of the binary sequence 304 when personalizing audio feeds for the given assessor 212—such the augmented audio feed 220, as described above.

In some non-limiting embodiments of the present technology, the first electronic device 702 can be configured to determine if the value of the given bit has been indicated in the given in-use audio feed 720 by comparing energy levels of the in-use audio signal 708 at a given one of the at the least two frequency levels and a frequency level adjacent thereto.

Thus, the first electronic device 702 can be configured to determine a first primary energy level 902 of the in-use audio signal 708 at a first one of the first set of frequency levels 408, $f_1$, used for conveying the value of the first bit of the binary sequence 304 in the augmented audio feed 220. Further, the first electronic device 702 can be configured to determine a first secondary energy level 903 of the in-use audio signal 708 at a first adjacent frequency level 904, $\bar{f}_1$, to the first one of the first set of frequency levels 408, $f_1$. Further, the first electronic device 702 can be configured to determine a first difference value 907 (such as an absolute value thereof) between the primary energy level 902 and the first secondary energy level 903 associated with the first one of the first set of frequency levels.

It should be noted that it is not limited how the first electronic device 702 is configured to determine the first adjacent frequency level 904; and in some non-limiting embodiments of the present technology, the first electronic device 702 can be configured to determine the first adjacent frequency level 904 based on a predetermined frequency step from the first one of the first set of frequency levels 408, which can be, for example, Hz, 1 Hz, 10 Hz, and the like.

Further, according to certain non-limiting embodiments of the present technology, the first electronic device 702 can be configured to determine a first aggregate difference value by aggregating respective difference values associated with each one of the first set of frequency levels 408. Thus, based on the first aggregate difference value, as will be described below, the first electronic device 702 can be configured to determine a respective value of the first bit of an in-use binary sequence 908. Accordingly, if at least a portion of the in-use binary sequence 908 corresponds to the binary sequence 304 representative of the at least one indication of identity of the given assessor 212, in some non-limiting embodiments of the present technology, the first electronic device 702 can be configured to determine the presence of the respective identity watermark in the given in-use audio feed 720; or in other words, that the given in-use audio feed 720 has been personalized for the given assessor 212.

It should be noted that, in some non-limiting embodiments of the present technology, to determine the aggregate difference value, instead of using respective adjacent frequency levels that are higher than each one of the first set of frequency levels 408, such as the first adjacent frequency level 904, the first electronic device 702 can be configured to use respective lower adjacent frequency levels. For example, the first electronic device 702 can be configured to determine, based on the predetermined frequency step, a second adjacent frequency level 906, T. Accordingly, at the second adjacent frequency level 906, the first electronic device 702 can be configured to determine a second secondary energy level 905, and further a second difference value 909 therebetween and the first primary energy level 902, which the first electronic device 702 can be used for determining the first aggregate difference value.

Further, in some non-limiting embodiments of the present technology, to determine the first aggregate difference value associated with the first bit of the in-use binary sequence 908, the first electronic device 702 can be configured to select one of respective difference values associated with a lower adjacent frequency level and a higher adjacent frequency level of each one of the first set of frequency levels 408. For example, in some non-limiting embodiments of the present technology, the first electronic device 702 can be configured to select a minimum one the respective difference values associated with the lower adjacent frequency level and the higher adjacent frequency level. For example, if the first electronic device 702 has determined that an absolute value of the first difference value 907 is lower than an absolute value of the second difference value 909, the first electronic device 702 can be configured to select the first difference value 907 for generating the first aggregate difference value associated with the first bit of the in-use binary sequence 908.

However, it should be noted that, in other non-limiting embodiments of the present technology, the first electronic device 702 can be configured to select a maximum one of the respective difference values associated with each one of the first set of frequency levels 408 for generating—such as the second difference value 909 in the example above.

Further, according to some non-limiting embodiments of the present technology, to generate the first aggregate difference value associated with the first bit, the first electronic device 702 can be configured to sum absolute values of the respective difference values associated with each one of the first set of frequency levels 408, determined as described above. However, in other non-limiting embodiments of the present technology, the first electronic device 702 can be configured to sum the respective difference values algebraically, that is, considering respective signs of each one of the respective difference values.

Further, the first electronic device 702 can be configured to determine the respective value of the first bit of the in-use binary sequence 908 by comparing the first aggregate difference value with a predetermined threshold value. For example, in response to the first aggregate difference value being greater than the predetermined threshold value, the first electronic device 702 can be configured to determine the respective value of the first bit of the in-use binary sequence 908 as being positive, that is having the value of '1'. Accordingly, in response to the first aggregate difference value being equal to or lower than the predetermined threshold value, the first electronic device 702 can be configured to determine the respective value of the first bit as being negative, that is having the value of '0'.

However, in specific non-limiting embodiments of the present technology, the first electronic device 702 can be configured to apply a different approach to determining the first aggregate difference value. For example, the first electronic device 702 can be configured to determine a first aggregate sum of those respective difference values that are associated with frequency levels of the first set of frequency levels 408, at which the in-use audio signal 708 has respective primary energy levels (such as the first primary energy level 902) indicative of the respective value of the first bit of the in-use binary sequence 908 being '1'. Further, the first electronic device 702 can be configured to determine a second aggregate sum of those respective difference values that are associated with frequency levels of the first set of frequency levels 408, at which the in-use audio signal 708 has respective energy levels indicative of the respective value of the first bit of the in-use binary sequence 908 being '0'.

Further, according to some non-limiting embodiments of the present technology, the first electronic device 702 can be configured to determine the first aggregate difference value associated with the first bit as being a difference between the first aggregate sum and the second aggregate sum. In these embodiments, the first electronic device 702 can be configured to determine the respective value of the first bit by determining if the first aggregate difference value meets a predetermined condition. For example, the first electronic device 702 can be configured to determine the respective value of the first bit as being '1' if the first aggregate difference value is positive, that is, greater than '0'. By contrast, if the first aggregate difference value determined based on the first aggregate sum and the second aggregate sum as described above is equal to or lower than '0', that is, non-positive, the first electronic device 702 can thus be configured to determine the respective value of the first bit of the in-use binary sequence 908 as being '0'.

In additional non-limiting embodiments of the present technology, to determine the respective value of the first bit of the in-use binary sequence 908, the first electronic device 702 can be configured to determine a respective confidence level for each primary energy level of the in-use audio signal 708 at each one of the first set of frequency levels 408. A given confidence level is indicative of whether respective primary energy levels of the in-use audio signal 708, at a respective set of frequency levels, convey the respective value of the given bit of the binary sequence 304, or not. In other words, the given frequency level is indicative of a likelihood value of the respective energy levels of the in-use audio signal 708 having been modified for indicating, at the respective set of frequency levels, the respective value of the given bit of the binary sequence 304.

For example, in some non-limiting embodiments of the present technology, the first electronic device 702 can be configured to determine the respective confidence level for a given primary energy level of the in-use audio signal 708 in accordance with a following equation:

$$\log(E_i)-\min(\log \overline{E}_i, \log \overline{E}_l) \quad (1)$$

where $\overline{E}_i$ is the given primary energy level determined at a respective one of the respective set of frequency levels associated with the given bit of the in-use binary sequence 908, such as the first primary energy level 902 associated with the first bit of the in-use binary sequence 908;

$\overline{E}_i$ is a first respective secondary energy level determined at a higher adjacent frequency level to the respective one of the respective set of frequency levels, such as the first secondary energy level 903; and $\overline{E}_l$ is a second respective secondary energy level determined at a lower adjacent frequency level to the respective one of the respective set of frequency levels, such as the second secondary energy level 905.

Thus, the first electronic device 702 can be configured to determine respective confidence levels for each primary energy level of the in-use audio signal 708 at each one of the first set of frequency levels 408. Further, the first electronic device 702 can be configured to aggregate the respective confidence levels to determine a first aggregate confidence level associated with the first bit of the in-use binary sequence 908. For example, in some non-limiting embodiments of the present technology, the first electronic device 702 can be configured to determine the first aggregate confidence level similar to the first aggregate difference value, as described above. More specifically, the first electronic device 702 can be configured to determine the first aggregate confidence level by summing up respective confidence levels associated with frequency levels of the first set of frequency levels 408, at which the in-use audio signal 708 has respective primary energy levels indicative of the respective value of the first bit of the in-use binary sequence 908 being '1'; and subtracting those respective confidence levels associated with respective primary energy levels of the in-use audio signal indicative of the respective value of the first bit of the in-use binary sequence 908 being '0'.

Further, the first electronic device 702 can be configured to determine the respective value of the first bit of the in-use binary sequence 908 as being '1' if the first aggregate confidence level has a positive value; else determine the respective value as being '0'.

Thus, by analyzing other energy levels of the in-use audio signal 708 at frequency levels thereof corresponding to other respective sets of frequency levels used for indicating values of other bits of the binary sequence 304 in the augmented audio feed 220, using the in-use time-frequency representation 804, the first electronic device 702 can be configured to determine respective values of other bits of the in-use binary sequence 908. Further, the first electronic device 702 can be configured to determine if the in-use binary sequence 908 corresponds to the binary sequence 304 associated with the given assessor 212.

For example, in some non-limiting embodiments of the present technology, the first electronic device 702 can be configured to determine that the in-use binary sequence 908 corresponds to the binary sequence 304 if a predetermined threshold number of bits (such as ten, as an example) of the former has same values as respective bits of the latter. It is not limited how the predetermined threshold number of bits is identified within the in-use binary sequence 908; and in some non-limiting embodiments of the present technology, each one of the predetermined threshold number of bits may have a respective predetermined ordinal position within the in-use binary sequence 908—such as first, fourth, seventh, and the like. In other non-limiting embodiments of the present technology, the predetermined threshold number of bits may be the predetermined threshold number of consecutive bits, such as first consecutive bits, within the in-use binary sequence 908.

Thus, referring back to FIG. 7, in some non-limiting embodiments of the present technology, in response to determining that the in-use binary sequence 908 corresponds to the binary sequence 304, the first electronic device 702 can be configured to determine the presence of the respective identity watermark associated with the given assessor 212 in the given in-use audio feed 720 reproduced in the vicinity 706 thereof, which may mean that the given in-use audio feed 720 has been personalized for the given assessor 212 similar to the augmented audio feed 220, as described above.

It should be expressly understood that the present technology is not limited to executing the above approach to detecting the respective identity watermark in the given in-use audio feed 720 at the first electronic device 702; and in some non-limiting embodiments of the present technology, the server 202 can be configured to search the communication network 210 for audio feeds that could be considered as sensitive information thereto; and apply to such audio feeds, mutatis mutandis, the above approach to determine the presence therein of identity watermarks associated with one or more of the plurality of assessors 208. For example, in certain non-limiting embodiments of the present technology, the server 202 can be configured to search public web resources, such as social networks, forums, and others providing users thereof with a capability of publicly sharing media content, for suspicious audio feeds and further analyze such audio feeds as described above. In these embodiments, the server 202 can be configured to identify the suspicious audio feeds based on, without limitation, at least one of: (1) a duration thereof, such as equal to or shorter than a predetermined duration, for example, 20 seconds; (2) a name thereof—for example, if the name includes certain predetermined key words, such as "wake-up word"; and (3) a degree of affiliation thereof with one or more of the plurality of assessor 208—such as if a given audio feed has been posted in a social network via a private user account associated with the one or more of the plurality of assessors 208, as an example.

Further, having determined the presence of the respective identity watermark in the given in-use audio feed 720, the first electronic device 702 can be configured to generate a second data packet 714 including a warning notification of recognizing a personalized audio feed in the vicinity 706 thereof, that is, the given in-use audio feed 720; and transmit the second data packet 714 to the server 202 which may have produced the given in-use audio feed 720. In this regard, in some non-limiting embodiments of the present technology, upon receiving the second data packet 714 from the first electronic device 702, the server 202 could be configured to take certain preventive actions against the given assessor 212 to avert further spread of personalized audio feeds associated with the given assessor 212.

For example, in some non-limiting embodiments of the present technology, the server 202 could further be configured to restrict access by the given assessor 212 to their respective user account with the crowdsourcing application running at the server 202. The server 202 could be configured to restrict access to the given assessor 212 for a predetermined period, such as several hours, days or weeks, or, for example, while the instance of causing public access to the given in-use audio feed 720 is investigated. Also, in other non-limiting embodiments of the present technology, for recurrent instances of causing public availability of recordings included in digital tasks transmitted to the given assessor 212, the server 202 could be configured to ban the respective user account of the given assessor 212 for an indefinite period.

Second Method

Figure 10:
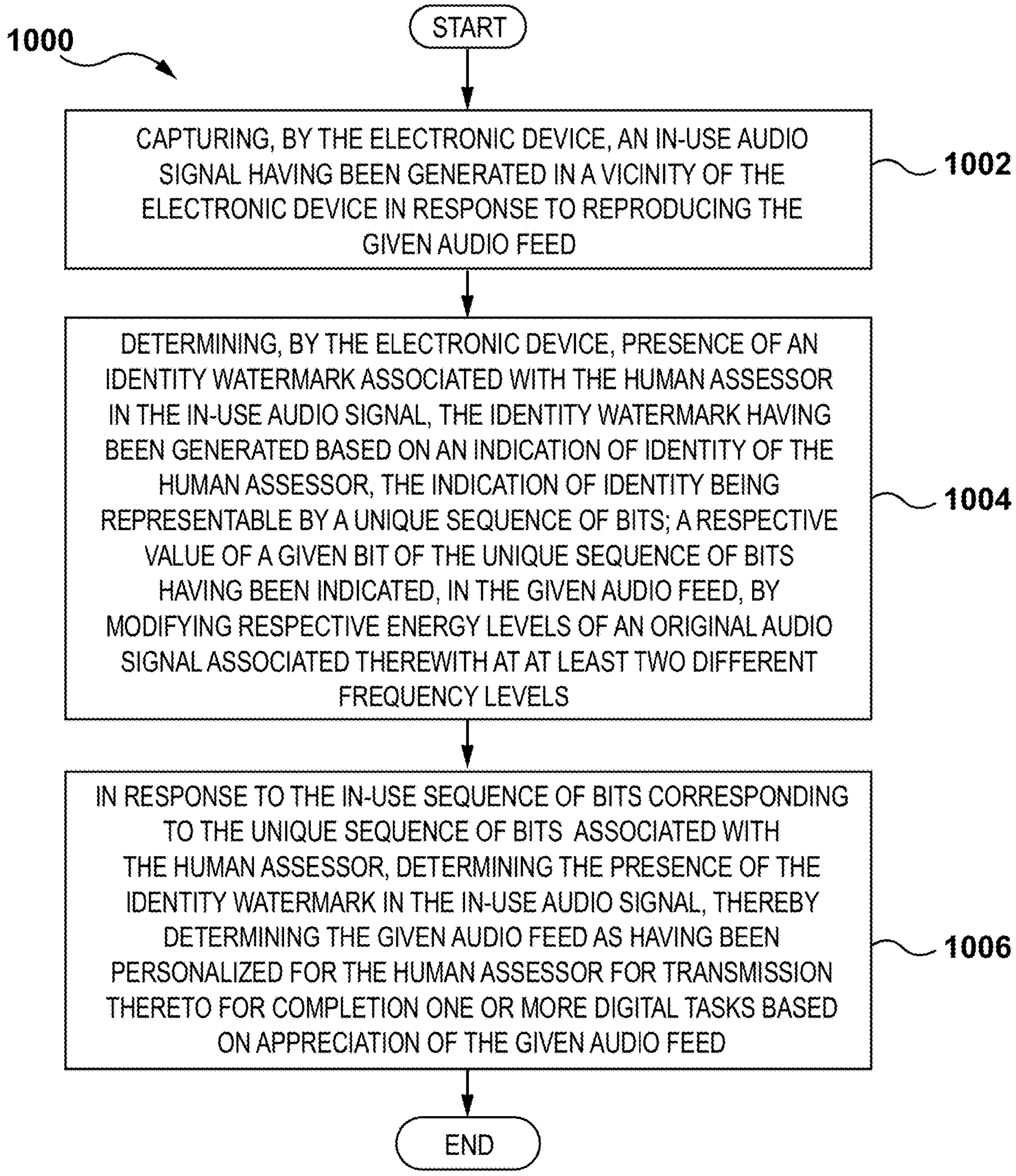
FIG. 10 depicts a flowchart of a method for determining an association between the given assessor and the in-use audio feed reproduced in the vicinity of the electronic device of the networked computing environment of FIG. 7, in accordance with certain non-limiting embodiments of the present technology.

Given the architecture and the examples provided hereinabove, it is possible to execute a method for determining an association between a given audio feed and a human assessor, such as that between the given in-use audio feed 720 and the given assessor 212. With reference to FIG. 10, there is depicted a flowchart of a second method 1000, according to the non-limiting embodiments of the present technology. The second method 1000 can be executed by the first electronic device 702.

Step 1002: Capturing, by the Electronic Device, an In-Use Audio Signal Having been Generated in a Vicinity of the Electronic Device in Response to Reproducing the Given Audio Feed The second method 1000 commences at step 1002 where the first electronic device 702 is configured to receive the in-use signal 708 of the given in-use audio feed 720 reproduced in the vicinity 706 of the first electronic device 702. For example, as described above with reference to FIG. 7, the given in-use audio feed 720 can be reproduced by the second electronic device 710 currently disposed such that the in-use audio signal 708 reaches the vicinity 706 of the first electronic device 702.

For example, in some non-limiting embodiments of the present technology, the second electronic device 710 can be the respective electronic device of the given assessor 212 dedicated to completing digital tasks received from the server 202. To that end, the first electronic device 702 can, for example, be a private electronic device of the given assessor 212. Thus, in these embodiments, prior to the determining the presence of the respective identity watermark associated with the given assessor, the first electronic device 702 can be configured to receive, form the server 202, the first data packet 712 including data of only the respective identity watermark associated with the given assessor 212, as described above.

However, in other non-limiting embodiments of the present technology, where the first electronic deice 702 and the second electronic device 710 are not associated with the given assessor 212, the first data packet 712 can include data of all respective identity watermarks associated with each one of the plurality of assessor 208, presence of which the first electronic device 702 can be configured to sequentially determine, as will be described below in respect of the identity watermark associated with the given assessor 212.

The second method 1000 hence advances to step 1004.

Step 1004: Determining, by the Electronic Device, Presence of an Identity Watermark Associated with the Human Assessor in the In-Use Audio Signal, the Identity Watermark Having been Generated Based on an Indication of Identity of the Human Assessor, the Indication of Identity being Representable by a Unique Sequence of Bits; a Respective Value of a Given Bit of the Unique Sequence of Bits Having been Indicated, in the Given Audio Feed, by Modifying Respective Energy Levels of an Original Audio Signal Associated Therewith at at Least Two Different Frequency Levels At step 1004, having captured the in-use audio signal 708, the first electronic device 702 can be configured to analyze it to determine presence therein the respective identity watermark of at least one of the plurality of assessors 208—such as the given assessor 212.

To that end, first, in some non-limiting embodiments of the present technology, the first electronic device 702 can be configured to generate the in-use time-frequency representation 804 of the in-use audio signal 708, for example, by applying the Fourier transform, as described above. Further, the first electronic device 702 can be configured to determine, using the in-use time-frequency representation 804, respective energy levels at each set of predetermined frequency levels used in the first method 600 for encoding the binary sequence 304 associated with the given assessor 212 in the audio feed 216. Further, as described above with reference to FIGS. 8 and 9, based on the so determined energy levels of the in-use audio signal 708, the first electronic device 702 may be configured to generate the in-use binary sequence 908 and further determine if the in-use binary sequence corresponds to the binary sequence 304 associated with given assessor 212.

More specifically, the first electronic device 702 can be configured to determine the respective value of the first bit of the in-use binary sequence 908 by determining the first primary energy value 902 and a second primary energy level 910 respectively associated with each one of the first set of frequency levels 408 used for indicating the first bit of the binary sequence 304 in the augmented audio feed 220. In other words, the first electronic device 702 can be configured to determine if the in-use audio signal 708 has been modified to have the respective predetermined energy levels at each one of the first set of frequency levels 408 to indicate therein the value of the first bit of the binary sequence 304 associated with the given assessor 212.

Further, as described above with reference to FIG. 9, the first electronic device 702 can be configured to determine respective secondary energy levels of the in-use audio signal 708 at frequency levels adjacent to each one of the first set of frequency levels 408—such as the first secondary energy level 903 and the second secondary energy level 905 respectively associated with the first adjacent frequency level 904 and the second adjacent frequency level 906 of the first one of the first set of frequency levels 408.

Further, to determine the respective value of the first bit of the in-use binary sequence 908, the first electronic device 702 can be configured to determine the respective difference values for each primary energy level of the in-use audio signal 708 at each one of the first set of frequency levels 408—such as the first difference value 907 and the second difference value 909 associated with the first primary energy level 902, as described above. Further, the first electronic device 702 can be configured to determine the first aggregate difference value associated with the first bit of the in-use binary sequence 908. Finally, if the first aggregate difference value meets the predetermined condition (such as the first aggregate difference value being positive, as an example), the first electronic device 702 can be configured to determine the respective value of the first bit as being ‘1’, else determine the first bit as having the value of ‘0’.

In other non-limiting embodiments of the present technology, as described further above with reference to FIG. 9, to determine the respective value of the first bit of the in-use binary sequence 908, the first electronic device 702 can be configured to determine the first aggregate confidence level associated with respective primary energy levels of the in-use audio signal 708 at each one of the first set of frequency levels 408. To that end, the first electronic device 702 can be configured to determine respective confidence levels for each one of the first primary energy level 902 and the second energy level 910 in accordance with Equation (1), as described above.

Thus, iteratively applying step 1004 to the in-use audio signal 708, based on the data from the first data packet 712, the first electronic device 702 can be configured to determine other bits of the in-use binary sequence 908.

The second method 1000 hence advances to step 1006.

Step 1006: In Response to the In-Use Sequence of Bits Corresponding to the Unique Sequence of Bits Associated with the Human Assessor, Determining the Presence of the Identity Watermark in the In-Use Audio Signal, Thereby Determining the Given Audio Feed as Having been Personalized for the Human Assessor for Transmission Thereto for Completion One or More Digital Tasks Based on Appreciation of the Given Audio Feed At step 1006, according to some non-limiting embodiments of the present technology, the first electronic device 702 can be configured to determine if the in-use binary sequence 908 corresponds to the binary sequence 304 associated with the given assessor 212. Accordingly, by determining the correspondence between the in-use binary sequence 908 and the binary sequence 304, the first electronic device 702 can be configured to determine the presence of the respective identity watermark associated with the given assessor 212 in the given in-use audio feed 720.

For example, as described above, the first electronic device 702 can be configured to determine that the in-use binary sequence 908 corresponds to the binary sequence 304 if the predetermined threshold number of bits (such as ten, as an example) of the former has same values as respective bits of the latter.

Further, having determined the presence of the respective identity watermark in the given in-use audio feed 720, the first electronic device 702 can be configured to generate the second data packet 714 including a warning notification of recognizing a personalized audio feed in the vicinity 706 thereof, that is, the given in-use audio feed 720; and transmit the second data packet 714 to the server 202. In this regard, in some non-limiting embodiments of the present technology, upon receiving the second data packet 714 from the first electronic device 702, the server 202 could be configured to take certain preventive actions against the given assessor 212 to avert further spread of personalized audio feeds associated with the given assessor 212, as described above.

Thus, certain non-limiting embodiments of the second method 1000 allow detecting pre-generated identity watermarks in audio feeds reproduced in a vicinity of electronic devices, which may further allow tracking down sources of leaking sensitive information and preventing damages to associated owning entitles.

It should be noted that, in some non-limiting embodiments of the present technology, the second method 1000 may be executed by the server 202 configured to search for suspicious audio feeds on the communication network 210, as described above.

The second method 1000 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for determining an association between a human assessor and a given audio feed reproduced by an electronic device, the method comprising:

capturing an in-use audio signal having been generated in a vicinity of the electronic device in response to reproducing the given audio feed;

determining presence of an identity water mark associated with the human assessor in the in-use audio signal, the identity watermark having been generated based on an indication of identity of the human assessor, the indication of identity being representable by a unique sequence of bits;

a respective value of a given bit of the unique sequence of bits having been indicated, in the given audio feed, by modifying respective energy levels of an original audio signal associated therewith at at least two different frequency levels, the respective value of the given bit being a binary value;

determining the respective value of the given bit including:

determining a respective primary energy level of the in-use audio signal at each one of the at least two different frequency levels;

determining a respective secondary energy level of the in-use audio signal at a respective adjacent frequency level to each one of the at least two different frequency levels;

determining, for each one of the at least two different frequency levels, a respective difference value between the respective primary energy level and the respective secondary energy level of the in-use audio signal;

aggregating respective difference values associated with the at least two different frequency levels to determine an aggregate difference value associated with the given bit, the aggregating comprising:

determining a first aggregate value as a sum over respective difference values associated with those of the at least two different frequency levels at which respective primary energy levels are indicative of the respective value of the given bit being '1';

determining a second aggregate value as a sum over respective difference values associated with those of the at least two different frequency levels at which respective primary energy levels are indicative of the respective value of the given bit being '0';

determining the aggregate difference value as being a difference between the first aggregate value and the second aggregate value;

determining, based on the aggregate difference value, a respective value of the given bit for inclusion thereof in an in-use sequence of bits associated with the in-use audio signal, the determining comprising:

determining the respective value as being 1' if the aggregate difference value is a positive value; and determining the respective value as being '0' if the aggregate difference value is a non-positive value; and in response to the in-use sequence of bits corresponding to the unique sequence of bits associated with the human assessor, determining the presence of the identity watermark in the in-use audio signal, thereby determining the given audio feed as having been personalized for the human assessor for transmission thereto for completion one or more digital tasks based on appreciation of the given audio feed.

2. The method of claim 1, further comprising, for a given frequency level of the at least two different frequency levels, the given frequency level being associated with the respective primary energy level of the in-use audio signal at the given frequency level:

determining a first respective secondary energy level at a first respective adjacent frequency level higher than the given frequency level;

determining a second respective secondary energy level at a second adjacent frequency level lower than the given frequency level;

determining a first respective difference value between the respective primary energy level and the first respective secondary energy level;

determining a second respective difference value between the respective primary energy level and the second respective secondary energy level and wherein:

the determining the respective difference value comprises determining a minimum one of the first respective difference value and the second respective difference value.

3. The method of claim 1, wherein the electronic device is an electronic device associated with the human assessor.

4. The method of claim 1, wherein the method is executable by a server configured to obtain the given audio feed, and wherein the in-use audio signal is generated by the server by processing the given audio feed.

5. The method of claim 4, wherein the server is configured to obtain the given audio feed by searching therefor at least one network resource.

6. The method of claim 1, wherein the determining the presence of the identity watermark in the in-use audio signal comprises first converting the in-use audio signal in a time-frequency representation thereof.

7. The method of claim 1, wherein the determining the given audio feed as having been personalized for the human assessor further includes generating, by the electronic device, a predetermined notification for transmission thereof to an entity associated with producing the given audio feed.

8. An electronic device for determining an association between a human assessor and a given audio feed, the electronic device comprising: at least one processor, at least one non-transitory computer readable memory comprising executable instructions, which, when executed by the at least one processor, cause the electronic device to:

capture an in-use audio signal having been generated in a vicinity of the electronic device in response to reproducing the given audio feed;

determine presence of an identity water mark associated with the human assessor in the in-use audio signal, the identity watermark having been generated based on an indication of identity of the human assessor, the indication of identity being representable by a unique sequence of bits;

a respective value of a given bit of the unique sequence of bits having been indicated, in the given audio feed, by modifying respective energy levels of an original audio signal associated therewith at at least two different frequency levels, the respective value of the given bit being a binary value;

determine the respective value of the given bit including:

determine a respective primary energy level of the in-use audio signal at each one of the at least two different frequency levels;

determine a respective secondary energy level of the in-use audio signal at a respective adjacent frequency level to each one of the at least two different frequency levels;

determine, for each one of the at least two different frequency levels, a respective difference value between the respective primary energy level and the respective secondary energy level of the in-use audio signal;

aggregate respective difference values associated with the at least two different frequency levels to determine an aggregate difference value associated with the given bit, by:

determining a first aggregate value as a sum over respective difference values associated with those of the at least two different frequency levels at which respective primary energy levels are indicative of the respective value of the given bit being '1';

determining a second aggregate value as a sum over respective difference values associated with those of the at least two different frequency levels at which respective primary energy levels are indicative of the respective value of the given bit being '0';

determining the aggregate difference value as being a difference between the first aggregate value and the second aggregate value;

determine, based on the aggregate difference value, a respective value of the given bit for inclusion thereof in an in-use sequence of bits associated with the in-use audio signal, by:

determining the respective value as being '1' if the aggregate difference value is a positive value; and determining the respective value as being '0' if the aggregate difference value is a non-positive value; and in response to the in-use sequence of bits corresponding to the unique sequence of bits associated with the human assessor, determine the presence of the identity watermark in the in-use audio signal, thereby determining the given audio feed as having been personalized for the human assessor for transmission thereto for completion one or more digital tasks based on appreciation of the given audio feed.

9. The electronic device of claim 8, wherein, for a given frequency level of the at least two different frequency levels, the given frequency level being associated with the respective primary energy level of the in-use audio signal at the given frequency level, the at least one processor further causes the electronic device to:

determine a first respective secondary energy level at a first respective adjacent frequency level higher than the given frequency level;

determine a second respective secondary energy level at a second adjacent frequency level lower than the given frequency level;

determine a first respective difference value between the respective primary energy level and the first respective secondary energy level;

determine a second respective difference value between the respective primary energy level and the second respective secondary energy level; and wherein to determine the respective difference value the at least one processor causes the electronic device to determine a minimum one of the first respective difference value and the second respective difference value.

10. The electronic device of claim 8, wherein the electronic device is an electronic device associated with the human assessor.

11. The electronic device of claim 8, wherein to determine the presence of the identity watermark in the in-use audio signal, first, the at least one processor causes the electronic device to convert the in-use audio signal in a time-frequency representation thereof.

12. The electronic device of claim 8, wherein further to determining the given audio feed as having been personalized for the human assessor further, the at least one processor further causes the electronic device to generate a predetermined notification for transmission thereof to an entity associated with producing the given audio feed.

* * * * *